United States Patent
Gomyo et al.

(10) Patent No.: US 6,663,287 B2
(45) Date of Patent: Dec. 16, 2003

(54) THRUST DYNAMIC PRESSURE BEARING APPARATUS AND METHOD FOR MANUFACTURING THE SAME

(75) Inventors: Masato Gomyo, Nagano (JP); Masayoshi Saichi, Nagano (JP); Takayuki Narita, Nagano (JP); Kazushi Miura, Nagano (JP); Masaaki Sato, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 09/749,264

(22) Filed: Dec. 27, 2000

(65) Prior Publication Data

US 2001/0006565 A1 Jul. 5, 2001

(30) Foreign Application Priority Data

Dec. 27, 1999 (JP) ............................................ 11-368934
Dec. 28, 1999 (JP) ............................................ 11-375531

(51) Int. Cl.$^7$ ................................................ F16C 32/06
(52) U.S. Cl. ........................................ 384/123; 384/121
(58) Field of Search ................................ 384/107, 112, 384/121, 123, 124

(56) References Cited

U.S. PATENT DOCUMENTS

| | | | | |
|---|---|---|---|---|
| 5,533,812 A | * | 7/1996 | Luethold et al. | 384/112 |
| 5,653,540 A | * | 8/1997 | Heine et al. | 384/123 |
| 5,806,987 A | * | 9/1998 | Nose et al. | 384/100 |
| 5,957,589 A | * | 9/1999 | Lee et al. | 384/112 |
| 5,993,066 A | * | 11/1999 | Leuthold et al. | 384/113 |
| 6,250,808 B1 | * | 6/2001 | Ichiyama | 384/100 |

* cited by examiner

*Primary Examiner*—William C Joyce
*Assistant Examiner*—Timothy McAnulty
(74) *Attorney, Agent, or Firm*—Hogan & Hartson, LLP

(57) ABSTRACT

A thrust dynamic pressure bearing apparatus includes a shaft member and a thrust plate having a fixing hole that is provided with chamfered sections Ca and Cb at the fixing hole. The shaft member is shrink fitted or pressure inserted in the fixing hole of the thrust plate. The chamfered sections Ca and Cb have axial lengths La and Lb in the axial direction. Dimensional relations of the axial lengths La and Lb in the chamfered sections Ca and Cb are set to be within a specified range to evenly distribute the bonding force of the thrust plate applied to the shaft member along the axial direction.

12 Claims, 12 Drawing Sheets

THRUST DYNAMIC PRESSURE BEARING APPARATUS AND METHOD FOR MANUFACTURING THE SAME

BACKGROUND OF THE INVENTION

1. Field of the Invention

The present invention relates to a thrust dynamic pressure bearing apparatus that rotatably supports a shaft member and a bearing member in a thrust direction by a dynamic pressure of a lubrication fluid, and a method for manufacturing a thrust dynamic pressure bearing apparatus.

2. Description of Related Art

In recent years, various proposals have been made for dynamic pressure bearing apparatuses that rotatably support rotor members such as magnetic discs, polygon mirrors, optical discs and the like at high speed. For example, FIG. 13 shows a thrust bearing section of a typical dynamic pressure bearing. The thrust bearing section includes a shaft member 11 that is connected to a thrust plate 2 and a thrust bearing member that is formed from a bearing sleeve 3 and a counter plate 4. The thrust plate 2 has dynamic pressure surfaces disposed opposite, in an axial direction of the shaft member 11, to a dynamic pressure surface of the bearing sleeve 3 and a dynamic pressure surface of the counter plate 4 with a specified gap provided between these dynamic pressure surfaces. Lubrication fluid such as air, oil or the like is filled in the gaps. Dynamic pressure generation grooves (not shown) are formed in at least one set of the dynamic pressure surfaces. As the shaft member rotates, the dynamic pressure generation grooves causes a dynamic pressure action to pressurize the lubrication fluid. As a result, dynamic pressure is generated in the lubrication fluid such that the shaft member 1 is floated and rotatably supported by the dynamic pressure with respect to the counter plate 4.

The thrust plate 2 used in this type of thrust dynamic pressure bearing apparatus has an affixing aperture 2a formed in its central area. The shaft member 1 is attached to the thrust plate 2 by an insertion connection means that may be provided by pressure inserting or shrink-fitting the shaft member 1 in the aperture 2a of the thrust plate 2. The thrust plate 2 contacts the shaft member 1 along a fixing connection section having an axial length Lh. The insertion connection means causes a compression stress working in a direction from an internal wall surface of the aperture 2a of the thrust plate 2 toward an external peripheral surface of the shaft member 1, such that the stress of the thrust plate 2 works in a radial direction toward the center of the shaft member 1. As a result, the thrust plate 2 strongly compresses the shaft member 1 along the fixing connection section having the axial length Lh.

Generally, a shaft end section of the shaft member 1 or open sections of the aperture 2a on both end faces of the thrust plate 2 are formed with chamfered sections 5, 6 and 7, respectively. Each of the chamfered sections 5, 6 and 7 is linear or curved in cross section. The chamfered sections 5, 6 and 7 are formed by diagonally cutting an edge of the shaft end section of the shaft member 1, and peripheral edges of the open sections of the aperture 2a of the thrust plate 2. By the provision of the chamfered sections 5, 6 and 7, an end area of the shaft end section of the shaft member 1 reduces in the radial direction toward the tip of the shaft member 1, and an opening area of the aperture 2a outwardly expands. As a result, the chamfered sections 5, 6 and 7 facilitate insertion of the shaft member 1 in the thrust plate 2.

As describe above, the chamfered sections 5, 6 and 7 are provided in the shaft member 1 and the thrust plate 2 to facilitate insertion of the shaft member 1 in the thrust plate 2. However, when the shaft member 1 and the thrust plate 2 having the chamfer structure described above are used to form a thrust dynamic pressure bearing section, satisfactory dynamic pressure characteristics are not obtained. The inventors of the present invention have discovered that the unsatisfactory dynamic pressure characteristics are caused by the following factors:

When the chamfered sections 5, 6 and 7 in the shaft member 1 and the thrust plate 2 have sizes that are outside a specified range of relative dimensional differences, the action of the compression stress in the thrust plate 2 that is created by the pressure fitting or the shrink-fitting becomes asymmetrical in the axial direction. As a result, the thrust plate 2 deforms itself. By the deformation, the thrust plate 2 warps in an arc shape or an opened umbrella shape toward one of the chamfered sections 5, 6, and 7 that has the largest size.

This phenomenon occurs even when the shaft member 1 does not have a chamfered section 5, and only the thrust plate 2 is provided with chamfer sections 6 and 7.

When the thrust plate 2 is deformed for the reasons described above, the perpendicularity between the shaft member 1 and the thrust plate 2 may be lost, and the thrust plate 2 cannot remain in parallel with the thrust bearing members 3 and 4, with the result that the dynamic pressure characteristic is substantially deteriorated. Also, the gaps in the thrust dynamic pressure bearing section become uneven in the peripheral direction. As a result, the balance of the pumping force generated by the fluid pressurizing means such as the dynamic pressure generation grooves is lost, and a specified float amount cannot be obtained. Furthermore, the minimum rotation speed that is required to float the shaft member 1 and the thrust plate 2 increases. In the worst case, the shaft member 1 and the thrust plate 2 may contact with the sleeve member 3 and/or the counter plate 4, with the result that the wear of the moving parts is promoted and the service life of the dynamic pressure bearing apparatus is shortened.

SUMMARY OF THE INVENTION

It is an object of the present invention to provide a thrust dynamic pressure bearing apparatus and a method of manufacturing a thrust dynamic pressure bearing apparatus that optimizes the dynamic pressure characteristics of a thrust dynamic pressure bearing section of the thrust dynamic pressure bearing apparatus.

In accordance with one embodiment of the present invention, a thrust dynamic pressure bearing apparatus includes a shaft member and a thrust plate having a fixing hole that is provided with chamfered sections Ca and Cb at the fixing hole. The shaft member is shrink fitted or pressure inserted in the fixing hole of the thrust plate. The chamfered sections Ca and Cb have axial lengths La and Lb in the axial direction. Dimensional relations of the axial lengths La and Lb in the chamfered sections Ca and Cb are set to be within a specified range.

In accordance with another embodiment of the present invention, a thrust dynamic pressure bearing apparatus includes a shaft member and a thrust plate having a fixing hole that is provided with chamfered sections at the fixing hole. The shaft member is shrink fitted or pressure inserted in the fixing hole of the thrust plate. The internal surface of the fixing hole engages the external surface of the shaft member along a fixing connection section having a length Lh. Axial distances La and Lb measured from end faces of the thrust plate to ends of the fixing connection section in the axial direction are set within a specified range with respect to the length Lh. As a result, the bonding force of the thrust plate applied to the shaft member is evenly distributed along the axial direction, and deformation of the thrust plate is suppressed to a very small amount in a range that does not affect the dynamic pressure characteristics. As a result, the deformation of the thrust plate can be well prevented by a relatively simple structure, and good thrust dynamic pressure characteristics can be maintained for a long time. More specifically, nonsynchronous oscillation (NRRO) is reduced and good bearing characteristics can be obtained, abrasion of parts within the bearing assembly is prevented, and the service life of the bearing is extended. Accordingly, the reliability of the thrust dynamic pressure bearing apparatus can be substantially improved.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

Embodiments of the present invention will be described with reference to the accompanying drawings. First, a general structure of a hard disc drive apparatus (HDD) having a dynamic pressure bearing assembly is described.

Figure 1:
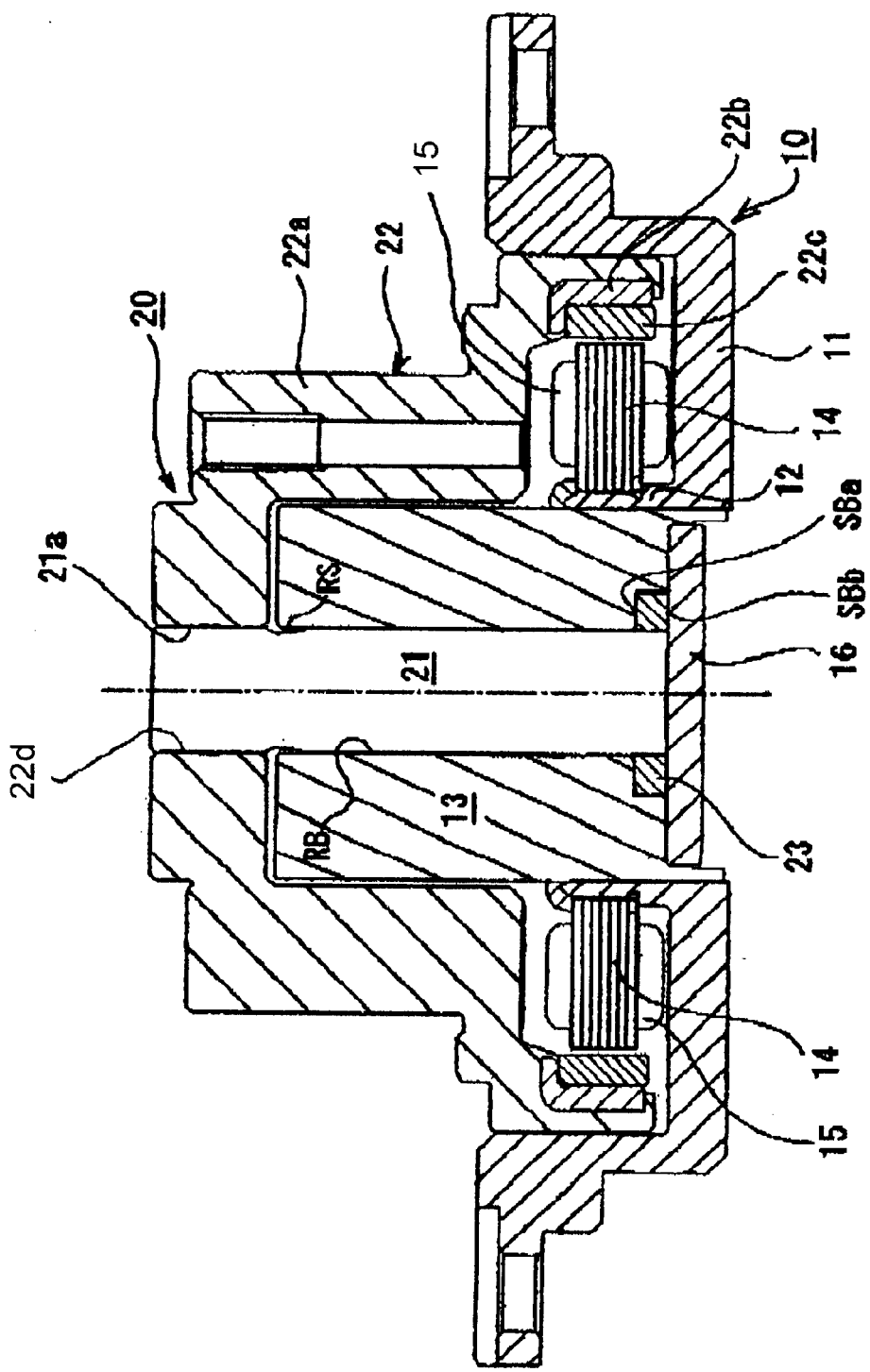
FIG. 1 is a cross-sectional view of a general structure of a hard disc drive apparatus (HDD) having a dynamic pressure bearing apparatus with a rotor shaft in accordance with one embodiment of the present invention.

FIG. 1 shows a cross section of an overall structure of an HDD spindle motor with a rotor shaft. The HDD spindle motor has a stator assembly 10 as a fixed member and a rotor assembly 20 as a rotor member that is mounted over the stator assembly 10 from above in the figure. The stator assembly 10 has a fixing frame 11 that is fixed to a fixing base by screws (not shown). The fixing frame 11 is formed from an aluminum based metal material to reduce its weight, and formed with a circular bearing holder section 12 about the central area of the fixing frame 11. A bearing sleeve 13 in a void cylindrical shape as a fixed bearing member is connected to an internal surface of the bearing holder section 12 by a pressure-insertion or shrink-fit method. The bearing sleeve 13 is formed from a copper-based material such as phosphorous bronze to facilitate machining of its central hole.

A stator core 14 that is formed from a member of stacked electromagnetic steel plates is mounted on an external mounting surface of the bearing holder 12. The stator core 14 has salient poles that are wound by a coil 15.

A rotor shaft 21 that composes the rotor assembly 20 is inserted in the central hole of the bearing sleeve 13 in a freely rotatably manner. The bearing sleeve 13 has a peripheral wall section that is provided with a dynamic pressure surface, and the rotor shaft 21 has an external peripheral surface that is provided with a dynamic pressure surface. The dynamic pressure surface of the bearing sleeve 13 and the dynamic pressure surface of the rotor shaft 21 are disposed opposite to each other in the radial direction with a minute gap between the dynamic pressure surfaces. A radial dynamic pressure bearing section RB is formed in the minute gap section. More specifically, the dynamic pressure surface of the bearing sleeve 13 and the dynamic pressure surface of the rotor shaft 21 in the radial dynamic pressure bearing section RB are spaced a specified minute distance of several IIm from each other around the periphery of the rotor shaft 21. A lubrication fluid, such as, for example, oil, magnetic fluid, air or the like, is continuously charged in the minute gape along the axial direction.

At least one of the dynamic pressure surfaces on the bearing sleeve 13 and the rotor shaft 21 is provided with radial dynamic pressure generation grooves in, for example, a herringbone shape (not shown) that may be divided into two groups in the axial direction. When the rotor shaft 21 is rotated, the radial dynamic pressure generation grooves causes a pumping operation to pressurize the lubrication fluid to create dynamic pressure. As a result, the dynamic pressure of the lubrication fluid supports the rotor shaft 21 together with a rotor hub 22 in the axial direction in a non-contact manner with respect to the bearing sleeve 13.

A capillary seal section RS is provided in an upper portion of a bearing space that composes the radial dynamic pressure bearing section RB. The capillary seal section RS is defined by a gap created by a sloped surface formed in either of the rotor shaft 21 or the bearing sleeve 13 in which the gap gradually expands in an outward direction of the bearing. The gap is generally set at, for example, 20 IIm to 300 IIm. The capillary seal section RS has a specified size so that the surface of the lubrication fluid is positioned in the capillary seal section RS whether the motor is rotating or stopping.

The rotor hub 22 together with the rotor shaft 21 that form the rotor assembly 20 is used to mount a recording medium such as a magnetic disc (not shown). The rotor hub 22 is formed from a cup-like member composed of an aluminum-based material, such as for example, aluminum, aluminum alloy or the like. The rotor hub 22 has an affixing hole 22d formed in its central section. The affixing hole 22d of the rotor hub 22 is connected to an upper end section of the rotor shaft 21 by a pressure-insertion or a shrink-fit method.

The rotor hub 22 has a body section 22a in a generally cylindrical configuration having an external peripheral section on which a recording media disc is mounted. The body section 22a has a lower internal wall surface. A circular drive magnet 22c is attached through a back yolk 22b on the lower internal wall surface of the body section 22a. The magnet 22c is circularly disposed opposite and adjacent to an external peripheral surface of the stator core 14.

A disc-like thrust plate 23 is affixed to a lower end section of the rotor shaft 21. The thrust plate 23 is disposed within a cylindrical recessed section formed on the internal surface of the bearing sleeve 13 at a lower end portion of the bearing sleeve 13. A top surface of the thrust plate 23 is formed with a dynamic pressure surface. The recessed section of the bearing sleeve 13 has a dynamic pressure surface that is disposed opposite and in proximity to the dynamic pressure surface on the top surface of the thrust plate 23. At least one of the dynamic pressure surfaces of the thrust plate 23 and the recessed section of the bearing sleeve 13 is formed with dynamic pressure generation grooves, to thereby form an upper thrust dynamic pressure bearing section SBa in a gap between the dynamic pressure surfaces of the thrust plate 23 and the recessed section of the bearing sleeve 13.

A counter plate 16 formed from a disc-like member of a relatively large diameter is disposed adjacent to a lower dynamic pressure surface of the thrust plate 23. The counter plate 16 is affixed to the bearing sleeve 13 in a manner to cover a lower opening of the bearing sleeve 13. At least one of the lower dynamic pressure surface of the thrust plate 23 and a dynamic pressure surface provided on the top surface of the counter plate 16 is formed with dynamic pressure generation grooves, to thereby form a lower thrust dynamic pressure bearing section SBb in a gap between the dynamic pressure surfaces of the thrust plate 23 and counter plate 16.

The dynamic pressure surfaces of the thrust plate 23 and the dynamic pressure surfaces provided on the bearing sleeve 13 and the counter plate 16, form one pair of the thrust dynamic pressure bearing sections SBa and SBb. Each of the dynamic pressure surfaces of the thrust dynamic pressure bearing sections SBa and SBb is spaced in the axial direction a minute distance of several IIm from one another, respectively. A lubrication fluid is charged in the minute gap that communicates with a peripheral passage formed around the thrust plate 23.

Figure 2:
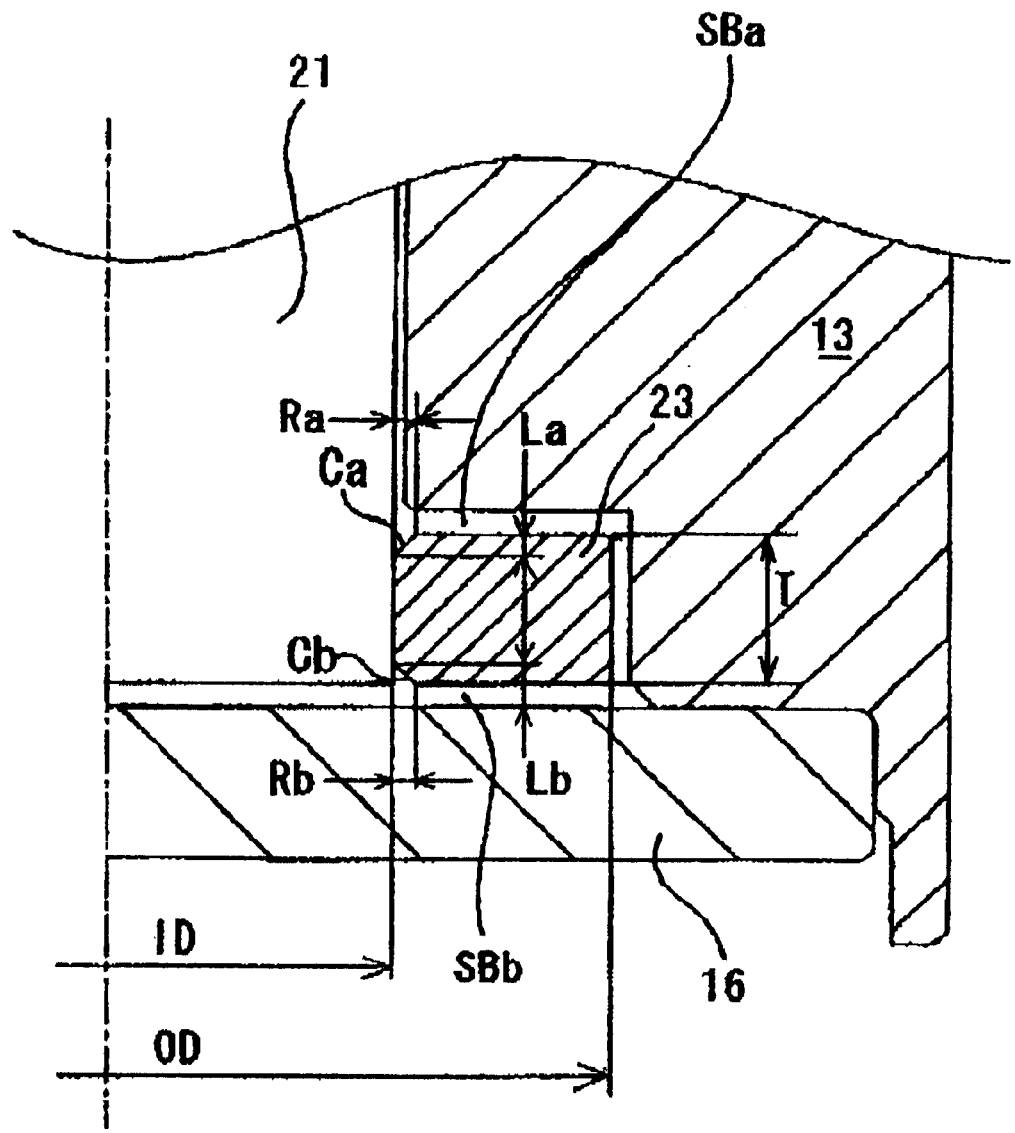
FIG. 2 is an expanded partial cross-sectional view of a thrust dynamic pressure bearing section of the dynamic pressure bearing apparatus shown in FIG. 1.

At least one of the dynamic pressure surfaces on the thrust plate 23, the bearing sleeve 13 and counter plate 16 is provided with radial dynamic pressure generation grooves DG, for example, in a circular herringbone configuration, as shown in FIG. 2. When the rotor shaft 21 is rotated, the radial dynamic pressure generation grooves DG causes a pumping operation to pressurize the lubrication fluid to create dynamic pressure. As a result, the dynamic pressure of the lubrication fluid supports the rotor shaft 21 and the rotor hub 22 in the thrust direction in a non-contact manner.

Figure 4:
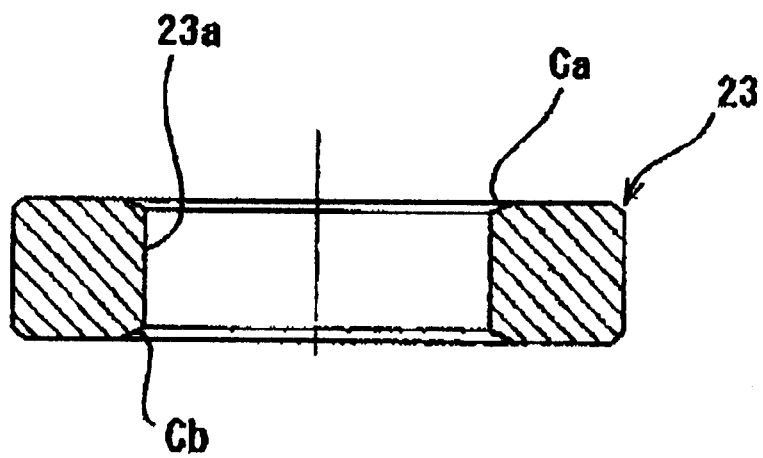
FIG. 4 is a cross-sectional view of a thrust plate.

The thrust plate 23 and the rotor shaft 21 are affixed to each other by an insertion connection means that is achieved by a pressure-insertion method or a shrink-fit method. As shown in FIG. 4, the thrust plate 23 has a affixing aperture 23a formed in its central area. The rotor shaft 21 is connected to the thrust plate 23 by an insertion connection means that may be provided by pressure inserting or shrink-fitting the rotor shaft 21 in the aperture 23a of the thrust plate 23. The insertion connection means causes a compression stress working in a direction from an internal wall surface of the aperture 23a of the thrust plate 23 toward an external peripheral surface of the rotor shaft 21. In other words, the insertion connection means causes the stress remaining in the thrust plate 23 to work in a radial direction toward the center of the rotor shaft 21, such that the thrust plate 23 strongly compresses the rotor shaft 21.

As shown in FIGS. 2 and 4, open sections of the aperture 23a on both end faces of the thrust plate 23 are formed with chamfered sections Ca and Cb, respectively. The chamfered sections Ca and Cb are formed by diagonally cutting peripheral edges of the open sections of the aperture 23a of the thrust plate 23. Each of the chamfered sections Ca and Cb is linear in cross section. By the provision of the chamfered sections Ca and Cb, an opening area of each of the opening sections of the aperture 23a outwardly expands. As a result, the chamfered sections Ca and Cb facilitate insertion of the rotor shaft 21 in the thrust plate 23.

On the other hand, by the provision of the chamfered sections Ca and Cb, the length of the fixing connection section between the thrust plate 23 and the rotor shaft 21 in the axial direction is reduced by the length of the chamfered sections Ca and Cb in the axial direction, and the bonding force is accordingly reduced. However, in accordance with the present embodiment, a special structure is employed to prevent the lowered bonding forces from becoming imbalance at both of the end faces of the thrust plate 23, as described below.

The thrust plate 23 of the present embodiment has a relatively large external diameter with respect to its thickness in the axial direction. More specifically, as shown in FIG. 2, when the thrust plate 23 has an external diameter OD, an internal diameter ID and a thickness T in the axial direction, and the chamfered sections Ca and Cb have an axial length La and an axial length Lb in their axial direction and a radial length Ra and a radial length Rb in their radial direction, the following relation is established:

$OD-ID\tau T$, and $La\tau 0.01T$, and $Lb\tau 0.01T$, and $Ra\tau 0.01T$ and $Rb\tau 0.01T$.

Moreover, when a relation OD ID=$4T\Delta(\Delta\delta 4)$ is established, the axial length La and the axial length Lb of the chamfered sections Ca and Cb satisfy a relation with the given value of $\Delta$ as follows: $La\delta\Delta Lb$, or $Lb\delta\Delta Lb$.

By setting the lengths of the chamfered sections Ca and Cb in the axial direction within the dimensional relations described above, the bonding forces at both of the end faces of the thrust plate 23 in the axial direction are mutually balanced.

In accordance with the present embodiment, the dimensional relations of the axial length La and the axial length Lb of the chamfered sections Ca and Cb provided at the aperture 23a of the thrust plate 23 are set to specified ranges. As a result, the bonding force of the thrust plate 23 with respect to the rotor shaft 21 are equally distributed along the axial direction. Accordingly, the degree of deformation of the thrust plate 23 is limited to a very small amount in a range that does not affect the dynamic pressure characteristics. This result can be confirmed by the following experiments.

Figure 5:
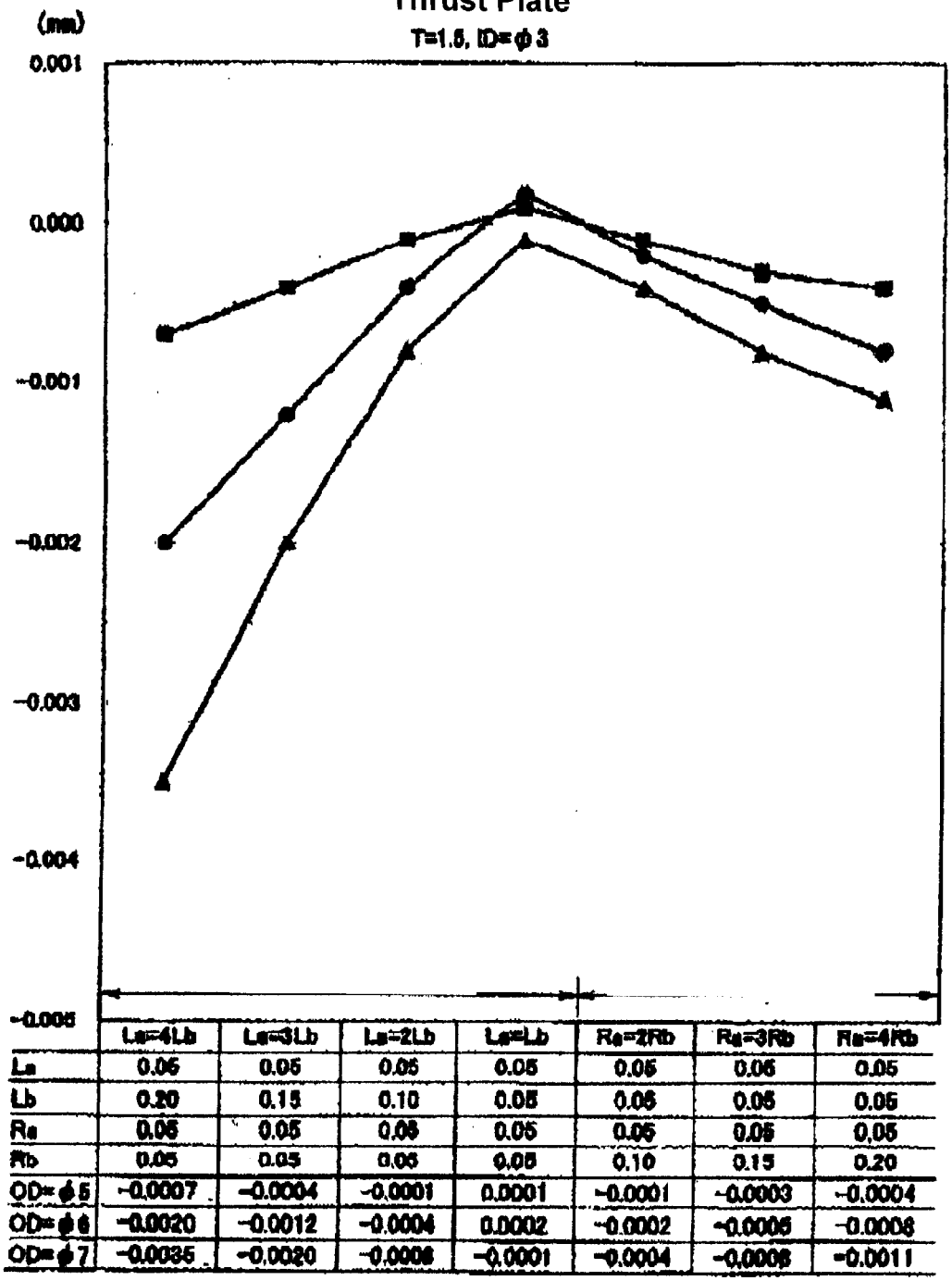
FIG. 5 shows a table (Table 1) showing relations between deformation amounts of thrust plates and dimensions chamfered sections.

The sizes of the thrust plate 23 and the chamfered sections Ca and Cb are changed, and deformed amounts from a neutral position of the thrust plate 23 are measured. Results of the measurements are shown in Table 1 of FIG. 5.

In view of the characteristic of the thrust dynamic pressure bearing section, the amount of deformation of the thrust plate 23 may preferably be ρ 5% or less with respect to a gap in the thrust dynamic pressure bearing section. For example, when a gap between the dynamic pressure surfaces of the thrust plate 23 and the recessed section of the bearing sleeve 13 in the thrust dynamic pressure bearing section is set to 0.015 mm, the upper limit of deformation amount of the thrust plate 23 is 0.00075 mm. According to Table 1, when the relations described above are satisfied, the deformation amount of the thrust plate 23 can be set to a value that does not exceed the upper limit.

In one example, according to Table 1, when T=1.5 mm, ID=3 mm (φ), and OD=5 mm (φ), $OD-ID=5-3=2$ Therefore, $4T/\alpha=2$ The value α that satisfies the above relation is 3. Therefore, the relation $\alpha \leq 4$ is satisfied.

A deformation amount of the thrust plate 3 under the conditions given above does not exceed the upper limit in each of the cases of La=4Lb, 3Lb, 2Lb and 1Lb.

Figure 6:
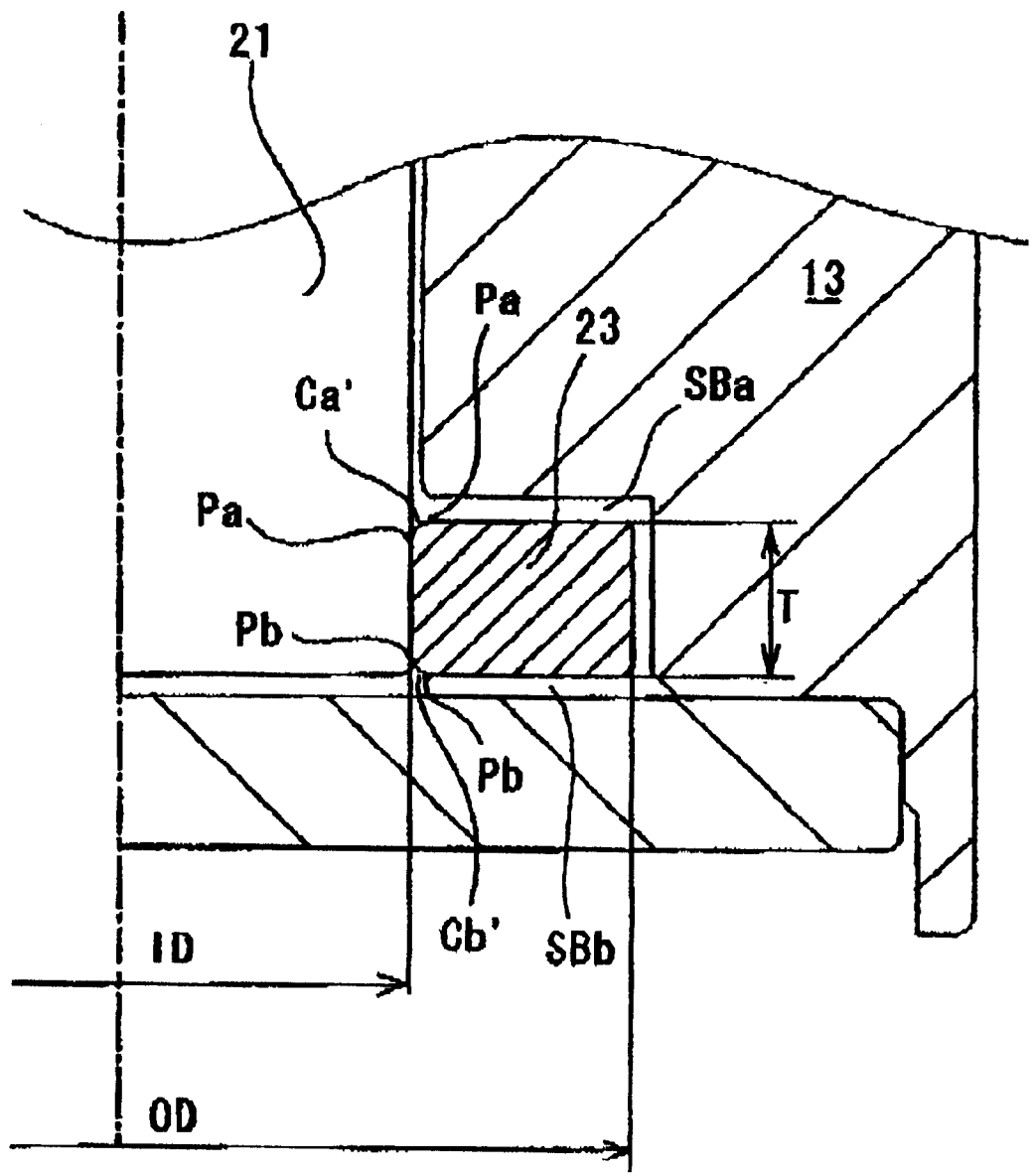
FIG. 6 is an expanded partial cross-sectional view of a thrust dynamic pressure bearing section of a dynamic pressure bearing apparatus of a variation of the embodiment shown in FIG. 2.

It is also understood from Table 1 that, in addition to the conditions given above, the following relations may preferably be established:

When $\alpha \leq 4$, $Ra \leq 1.5 \cdot \alpha \cdot Rb$, or $Rb \leq 1.5 \cdot \alpha \cdot Ra$ FIG. 6 shows a dynamic pressure thrust bearing section in accordance with another embodiment of the present invention. Members and parts of the embodiment shown in FIG. 6 that are similar to those of the embodiment shown in FIG. 2 are indicated by the same reference numbers. The thrust bearing section shown in FIG. 6 includes a thrust plate 23 having a fixing aperture 23a. The aperture 23a has opening sections on both end surfaces of the thrust plate 23 in the axial direction and chamfered sections Ca' and Cb' formed at the opening sections. Each of the chamfered sections Ca' and Cb' has a curved fillet shaped cross section. In this case, the axial lengths La and Lb and the radial lengths Ra and Rb of the chamfered sections Ca and Cb are measured from points of inflection Pa and Pb (where the chambered sections Ca' and Cb' contact the shaft 21) of the chamfered sections Ca' and Cb'. Dimensional relations of the chamfered sections Ca' and Cb' are set in a similar manner as those in the embodiment described above. As a result, the same actions and effects are obtained.

Figure 7:
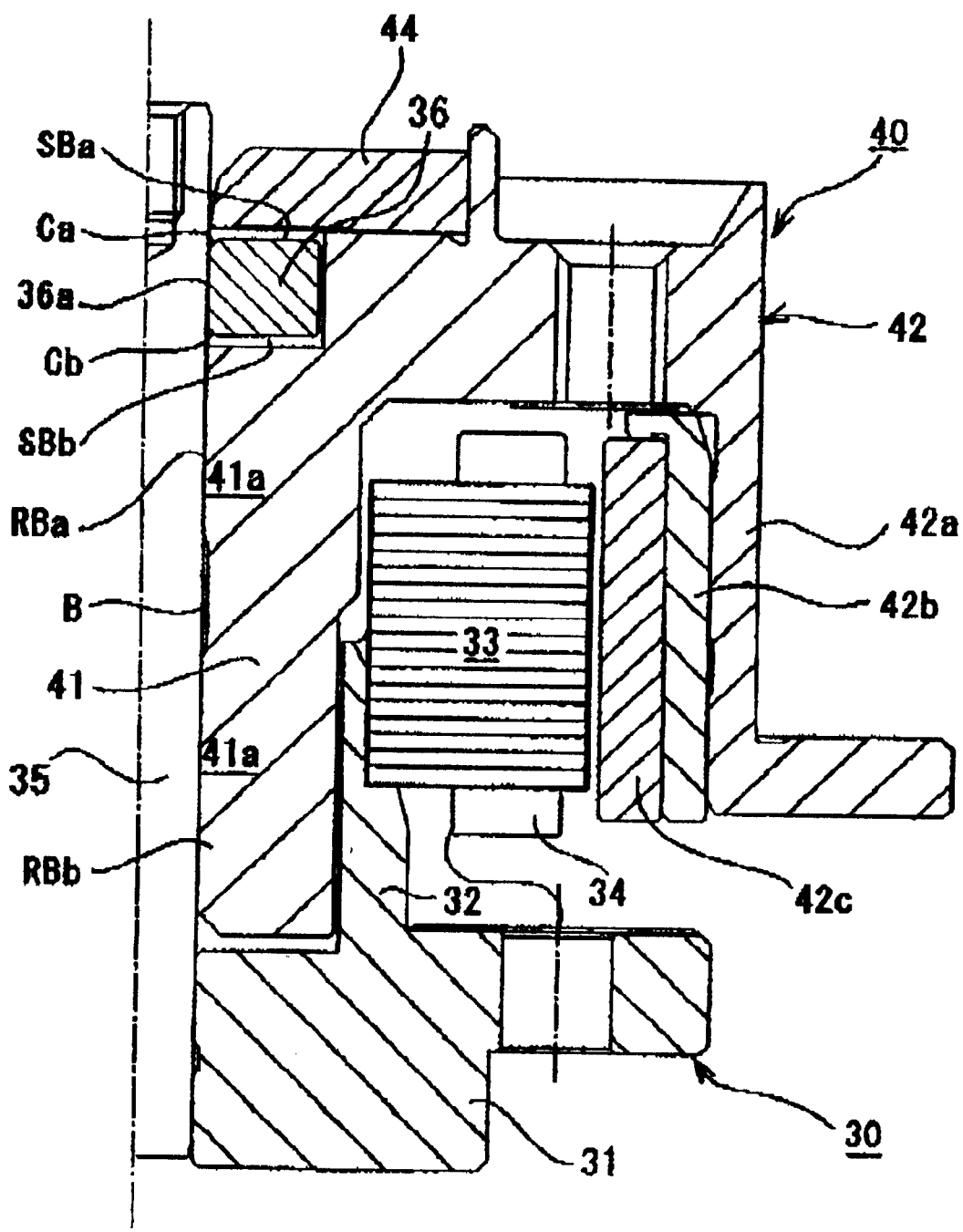
FIG. 7 is a cross-sectional view of a general structure of a hard disc drive apparatus (HDD) having a fixed shaft type dynamic pressure bearing apparatus in accordance with one embodiment of the present invention.

Also, a dynamic pressure bearing apparatus of the present invention is applicable to a fixed shaft type HDD spindle motor shown in FIG. 7.

FIG. 7 shows a cross section of an overall structure of an HDD spindle motor. The HDD spindle motor has a stator assembly 30 as a fixed member and a rotor assembly 40 as a rotor member that is mounted over the stator assembly 30 from above in the figure. The stator assembly 30 has a frame 31 that is fixed to a fixing base (not shown) by screws. The frame 31 is formed integrally with a core holder 32 of a void cylindrical shape about the central area of the frame 31. A stator core 33 is mounted on an external wall surface of the core holder 32. The stator core 33 has salient poles that are wound by coils 34.

A fixed shaft 35 that extends upwardly is affixed generally to the central area of the frame 31. The fixed shaft 35 is formed from a material such as stainless steel (SUS420J2) or the like. An upper end section of the fixed shaft 35 is provided with a female threaded hole. The upper end section of the fixed shaft 35 is affixed to a cover of the fixing base (not shown) by means of the female threaded hole and a threaded screw.

The rotor assembly 40 has a bearing sleeve 41 as a bearing member and a rotor hub 42 that is integrally formed with the bearing sleeve 41. The rotor hub 42 is rotatably mounted through the bearing sleeve 41 about the external peripheral surface of the fixed shaft 35. In other words, the rotor hub 42 of the rotor assembly 40 is disposed about the external periphery of the bearing sleeve 41. The rotor hub 42 has a generally cylindrical body section 42a. A magnetic recording media such as a magnetic disc is mounted about the peripheral section of the cylindrical body section 42a of the rotor hub 42. A drive magnet 42c is circularly mounted on the internal wall surface of the body section 42a through a back yolk 42b. The drive magnet 42c is disposed in a manner to oppose to an external end face of each of the salient poles of the stator core 33.

A pair of protruded bearing sections 41a and 41a that are spaced a specified distance from each other in the axial direction are formed on an internal wall section of the central hole of the bearing sleeve 41. The protruded bearing sections 41a and 41a are disposed opposite to and in proximity to the external surface of the fixed shaft 35. Dynamic pressure surfaces are provided on internal surfaces of the protruded bearing sections 41a and 41a. Also, dynamic pressure surfaces are formed on the external surface of the fixed shaft 35. The dynamic pressure surfaces on the protruded bearing sections 41a and 41a and the dynamic pressure surfaces on the fixed shaft 35 form a pair of radial dynamic pressure bearing sections RBa and RBb arranged in the axial direction in parallel with each other. The rotor hub 42 is rotatably supported in the radial direction with respect to the fixed shaft 35 by the pair of the radial dynamic pressure bearing sections RBa and RBb.

The dynamic pressure surfaces on the bearing sleeve 41 and the dynamic pressure surfaces on the fixed shaft 35 in the radial dynamic pressure bearing sections RBa and RBb are disposed opposite to each other. Each of the pair of the dynamic pressure surfaces on the bearing sleeve 41 and the dynamic pressure surfaces on the fixed shaft 35 are spaced a distance from each other, which forms a pair of minute gaps that continues to each other through the bearing space. Each of the bearing spaces is charged with lubrication fluid (for example, lubrication oil). An expanded space B that outwardly expands in the radial direction is provided between the dynamic pressure bearing sections RBa and RBb. The lubrication fluid is also charged in the expanded space B. In an alternative embodiment, the expanded space B may be filled with air that communicates with the atmosphere.

Among the dynamic pressure surfaces described above, at least the dynamic pressure surfaces on the bearing sleeve 41 are provided with a pair of radial dynamic pressure generation grooves in a herringbone configuration (not shown) that are circularly arranged in parallel with each other. When the rotor hub 42 is rotated, the radial dynamic pressure generation grooves cause a pumping action to pressurize the lubrication fluid to thereby generate dynamic pressure in the lubrication fluid. As a result, the dynamic pressure supports the bearing sleeve 41 in a non-contact manner with respect to the fixed shaft 35, and also supports the rotor hub 42 without contacting to other parts in the radial direction.

Capillary seal sections for retaining the lubrication fluid are provided at both end sections of the bearing space that forms the radial dynamic pressure bearing sections RBa and RBb. In other words, each of the radial dynamic pressure bearing sections RBa and RBb is interposed between the capillary seal sections. Each of the capillary seal sections is defined by a gap created by a sloped surface formed in the bearing sleeve 41 in which the gap gradually expands in an outward direction of the bearing. Each of the capillary seal sections has a specified size so that the surface of the lubrication fluid is positioned in the capillary seal section whether the motor is rotating or stopping.

A disc-like thrust plate 36 is affixed to a tip section (an upper end section in the figure) of the fixed shaft 35. The thrust plate 36 is disposed within a cylindrical recessed section formed in the internal surface of the bearing sleeve 41 at an upper end portion of the bearing sleeve 41. A bottom surface of the thrust plate 36 is formed with a dynamic pressure surface. The recessed section of the bearing sleeve 41 has a dynamic pressure surface that is disposed opposite in the axial direction and in proximity to the dynamic pressure surface on the bottom surface of the thrust plate 36 to thereby form a lower thrust dynamic pressure bearing section SBb.

A counter plate 44 formed from a disc-like member of a relatively large diameter is disposed adjacent to an upper dynamic pressure surface of the thrust plate 36. The counter plate 44 extends from the upper external peripheral section of the bearing sleeve 41 toward the central section of the bearing sleeve 41. A dynamic pressure surface is provided on the lower surface of the counter plate 44. The dynamic pressure surface on the counter plate 44 and the dynamic pressure surface provided on the upper surface of the thrust plate 36 form an upper thrust dynamic pressure bearing section SBa.

The dynamic pressure surfaces of the bearing sleeve 41 and the counter plate 44 are spaced by minute gaps of several Ilm from the dynamic pressure surfaces of the thrust plate 26 in the axial direction in the thrust dynamic pressure bearing sections SBa and SBb. Lubrication fluid (for example, lubrication oil) is charged through a passage formed around the external periphery of the thrust plate 36 into a pair of the minute gaps of bearing space that are separated in the axial direction by a specified distance.

Figure 3:
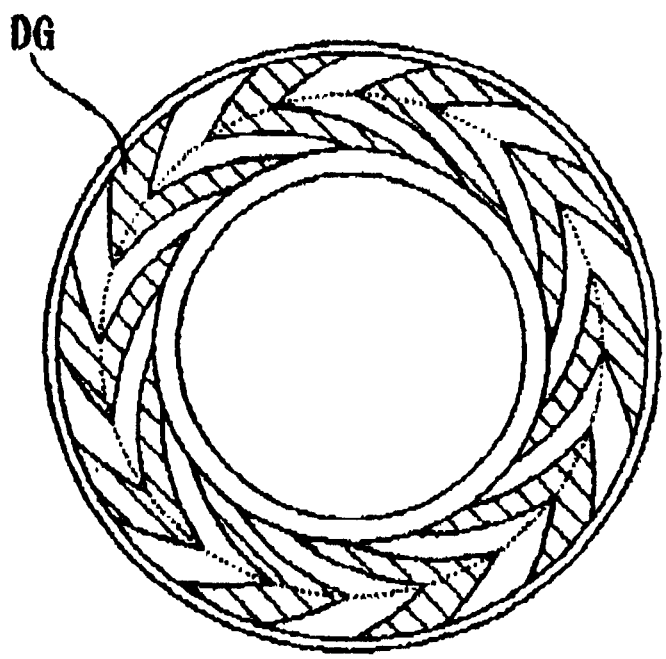
FIG. 3 is a plan view of one example of dynamic pressure generation grooves.

In accordance with the present embodiment, the upper and lower dynamic pressure surfaces of the thrust plate 36 in the axial direction are provided with thrust dynamic pressure generation grooves in a herringbone configuration (which are similar to the grooves D shown in FIG. 3) circularly arranged in parallel with one another. When the rotor hub 42 is rotated, both of the radial dynamic pressure generation grooves cause a pumping operation to pressurize the lubrication fluid to create dynamic pressure. As a result, the dynamic pressure of the lubrication fluid supports the bearing sleeve 41 and the rotor hub 42 in the thrust direction.

The thrust plate 36 and the fixed shaft 35 are attached to each other by an insertion connection means that may be achieved by a pressure-insertion method or a shrink-fit method in a similar manner described above. The thrust plate 36 has an affixing aperture 36*a* formed in its central area. The fixed shaft 35 is affixed to the thrust plate 36 by an insertion connection means that may be provided by pressure inserting or shrink-fitting the fixed shaft 36 in the aperture 36*a* of the thrust plate 36. The insertion connection means causes a compression stress that works in a direction from an internal wall surface of the aperture 36*a* of the thrust plate 36 toward an external peripheral surface of the fixed shaft 35.

Open sections of the aperture 36*a* on both end faces of the thrust plate 36 are formed with chamfered sections Ca and Cb, respectively. The chamfered sections Ca and Cb are formed by diagonally cutting peripheral edges of the open sections of the aperture 36*a* of the thrust plate 36. By the provision of the chamfered sections Ca and Cb, an opening area of each of the opening sections of the aperture 36*a* outwardly expands. As a result, the chamfered sections Ca and Cb facilitate insertion of the fixed shaft 35 in the thrust plate 36.

The thrust plate 36 of the present embodiment shown in FIG. 7 is formed to have dimensional relations that are similar to those of the embodiment shown in FIG. 2. In other words, the reference number "23" that indicates the thrust plate in FIG. 2 can be replaced with the reference number "36, and the dimensional relations described in the embodiment shown in FIG. 2 may be employed for the embodiment of FIG. 7.

More specifically, when the thrust plate 36 has an external diameter OD, an internal diameter ID and a thickness T in the axial direction, and the chamfered sections Ca and Cb have an axial length La and an axial length Lb in their axial direction and a radial length Ra and a radial length Rb in their radial direction, in a similar manner as the thrust plate 23 shown in FIG. 2, the following relations are established:

$OD-ID \geq T$, and $La \geq 0.01T$, and $Lb \geq 0.01T$, and $Ra \geq 0.01T$ and $Rb \geq 0.01T$.

Moreover, when a relation $OD-ID=4T/\alpha(\alpha \leq 4)$ is established, the axial length La and the axial length Lb of the chamfered sections Ca and Cb satisfy a relation with the given value of $\alpha$ as follows: $La \leq \alpha Lb$, or $Lb \leq \alpha La$.

As described above, in addition to the conditions given above, the following relations may preferably be established:

When $\alpha \leq 4$, $Ra \leq 1.5 \cdot \alpha \cdot Rb$, or $Rb \leq 1.5 \cdot \alpha \cdot Ra$ By setting the dimensions of the chamfered sections Ca and Cb in the axial direction within the dimensional relations as described above, the degree of deformation of the thrust plate 36 is limited to an amount in a range that does not affect the dynamic pressure characteristics, in a similar manner as described above with the embodiment shown in FIG. 2.

Figure 8:
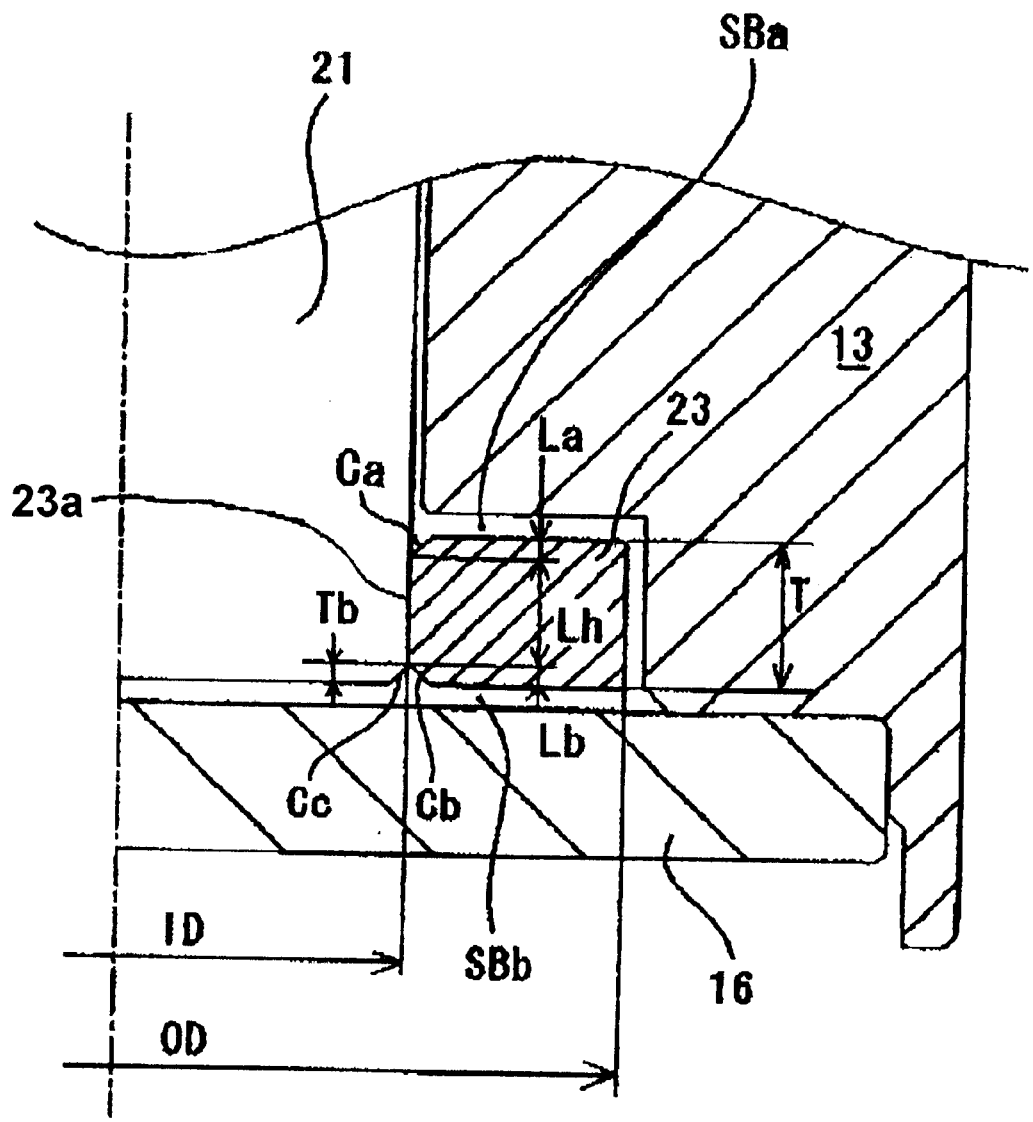
FIG. 8 is an expanded partial cross-sectional view of a thrust dynamic pressure bearing section of a dynamic pressure bearing apparatus with a rotor shaft in accordance with another embodiment of the present invention.

FIG. 8 shows a dynamic pressure bearing section in accordance with another embodiment of the present invention. Members or parts of the dynamic pressure bearing section shown in FIG. 8 similar to those shown in FIG. 2 are indicated by the same reference numbers.

As shown in FIG. 8, open sections of the aperture 23*a* on both end faces of the thrust plate 23 are formed with chamfered sections Ca and Cb, respectively. The chamfered sections Ca and Cb are formed by diagonally cutting peripheral edges of the open sections of the aperture 23*a* of the thrust plate 23. Also, a peripheral edge of an end section (a lower end section in FIG. 8) of the rotor shaft 21 is diagonally cut to form a chamfered section Cc. In the present embodiment, each of the chamfered sections Ca, Cb and Cc is linear in cross section. An opening area of each of the opening sections of the aperture 23*a* outwardly expands by the provision of the chamfered sections Ca and Cb. Also, an end area of the tip section of the rotor shaft 21 is reduced in the radial direction toward the tip section of the rotor shaft 21 by the provision of the chamfered section Cc. As a result, insertion of the rotor shaft 21 in the thrust plate 23 is facilitated.

On the other hand, by the provision of the chamfered sections Ca, Cb and Cc, the axial length Lh of the fixing connection section between the thrust plate 23 and the rotor shaft 21 in the axial direction is reduced, and the bonding force is accordingly reduced. However, in accordance with the present embodiment, a special structure is employed to prevent the lowered bonding forces from becoming imbalance at both of the end sections of the thrust plate 23, as described below.

In accordance with the present embodiment shown in FIG. 8, the thrust plate 23 is formed to have the following dimensional relations. In this embodiment, an axial distance La and an axial distance Lb or Tb are defined by distances measured from the end surfaces of the thrust plate 23 to both ends of the axial length Lh of the fixing connection section in the axial direction, respectively. The axial length La and the axial length Lb or Tb in their axial direction are set within a specified range of dimensional relations as described below.

In one embodiment, when the thrust plate 23 has an external diameter OD, an internal diameter ID and a thickness T in the axial direction, a relation OD−ID=4T/α(α≦4) is established. Also, the axial length La and the axial length Lb or Tb satisfy relations with the given value of α as follows:

When Lb≦La, La≦αLb (or Tb); or

When La≦Lb (or Tb), Lb (or Tb)≦αLa.

In the relations described above, greater one of the value Lb and the value Tb is used. Therefore, when the value Tb is greater, the value Lb shown in the equations above can be replaced with the value Tb. In other words, when the chamfered section Cc on the rotor shaft 21 is shorter in the axial direction than the chamfered section Ca or Cb on the thrust plate 23, the chamfered section Cc on the rotor shaft 21 does not shorten the length Lh of the fixing connection section. In this case, therefore, the other dimensional conditions are set only by considering the dimensional relations of the chamfered sections Ca and Cb on the thrust plate 23. On the other hand, when the chamfered section Cc on the rotor shaft 21 is greater in the axial direction than the chamfered section Cb on the thrust plate 23, the conditions need to be set in view of the axial dimension Tb of the chamfered section Cc on the rotor shaft 21.

Also, each of the distances La and Lb or Tb is set to be 20% or less of the length Lh of the fixing connection section, in other words, the following relation is established:

La≦0.2Lh, or Lb (or Tb)≦0.2Lh

In the relations described above, greater one of the value Lb and the value Tb is used. Therefore, when the value Tb is greater, the value Lb in the above equations can be replaced with Tb. By setting the dimensional relations in the manner described above, the bonding forces at both end sections of the thrust plate 23 in the axial direction are balanced.

Accordingly, by setting the axial distance La and the axial distance Lb or Tb from the end surfaces of the thrust plate 23 to both ends of the axial length Lh of the fixing connection section in the axial direction within specified ranges with respect to the axial length Lh of the fixing connection section, the bonding force of the thrust plate 23 with respect to the rotor shaft 21 is evenly distributed along the axial direction. As a result, the degree of deformation of the thrust plate 23 is limited to a very small amount in a range that does not affect the dynamic pressure characteristics. This result can be confirmed by the following experiments.

Figure 9:
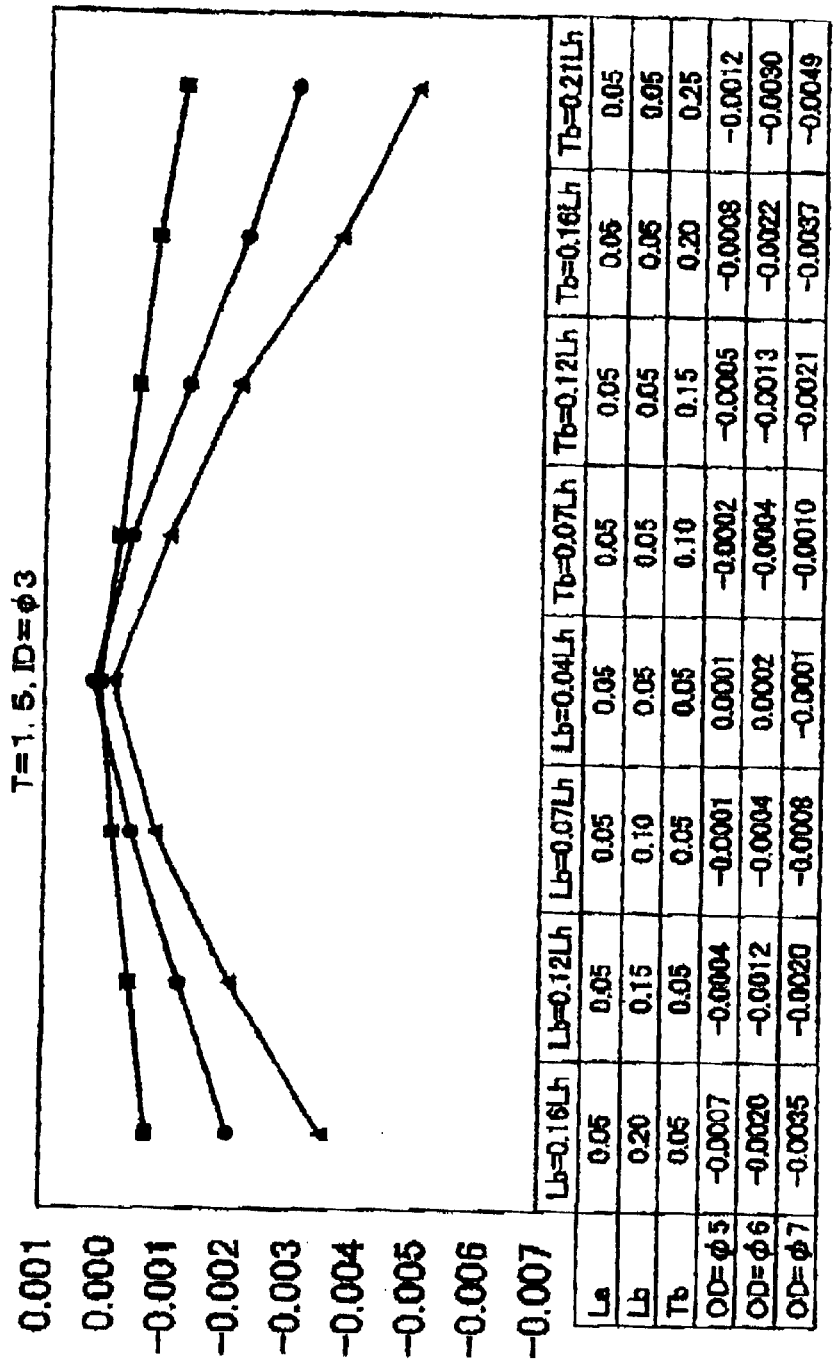
FIG. 9 shows a table (Table 2) showing relations between deformation amounts of thrust plates and dimensions chamfered sections.

The dimensions of the thrust plate 23 and the chamfered sections Ca, Cb and Cc are changed, and deformed amounts from a neutral position of the thrust plate 23 are measured. Results of the measurements are shown in Table 2 of FIG. 9.

In view of the characteristic of the thrust dynamic pressure bearing section, the amount of deformation of the thrust plate 23 may preferably be ±5% or less with respect to a gap in the thrust dynamic pressure bearing section. For example, when a gap in the thrust dynamic pressure bearing section is set to 0.015 mm, the upper limit of deformation amount of the thrust plate 23 is 0.00075 mm. According to Table 2, when the relations described above are satisfied, the deformation amount of the thrust plate 23 can be set to a value that does not exceed the upper limit.

In one example, according to Table 2, when T=1.5 mm, ID=3 mm (φ) and OD=5 mm (φ), OD−ID=5−3=2

Therefore, 4T/α=2

The value α that satisfies the above relation is 3. Therefore, the relation α≦4 is satisfied.

A deformation amount of the thrust plate 3 under the conditions given above does not exceed the upper limit in each of the cases.

Figure 10:
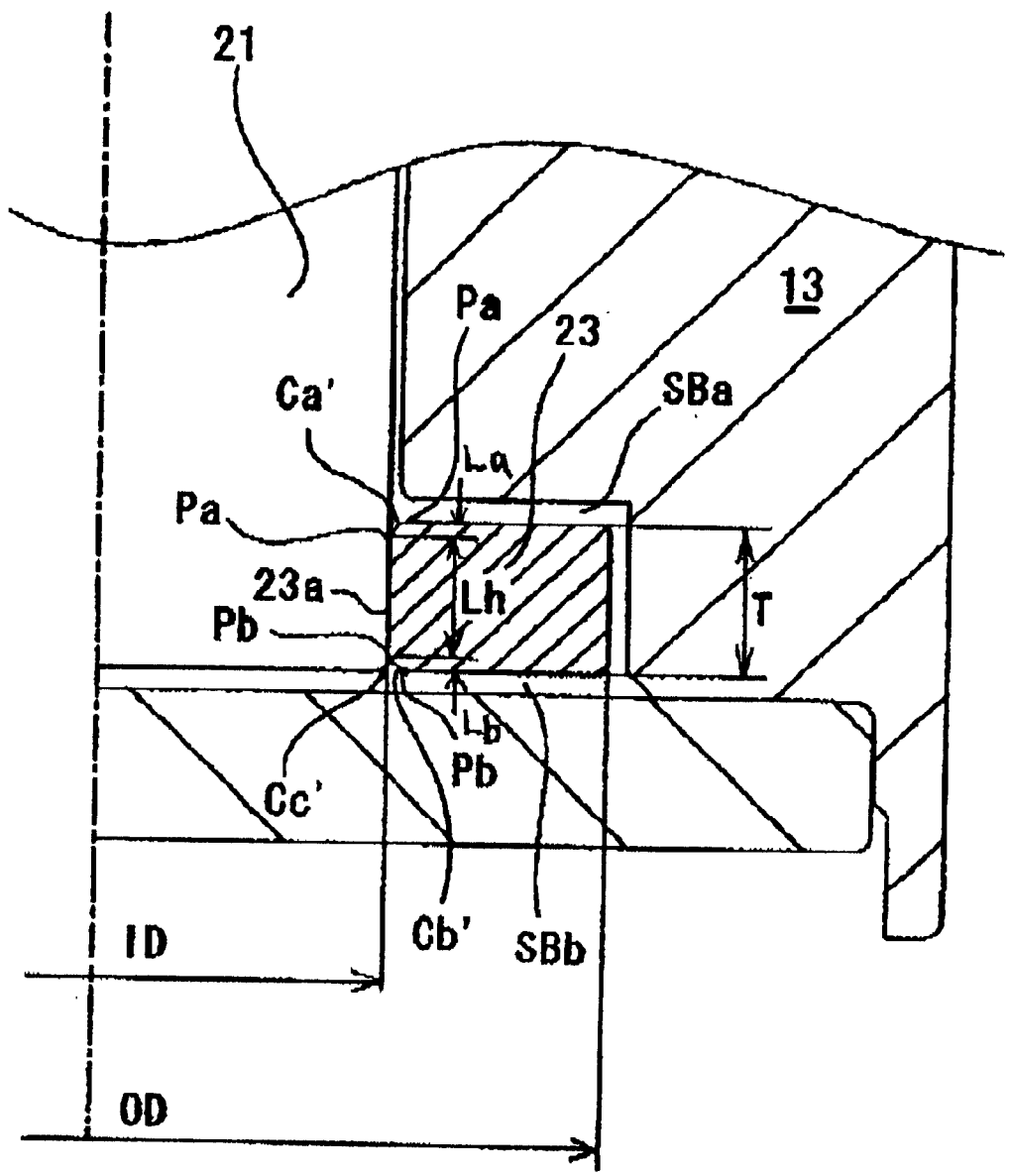
FIG. 10 is an expanded partial cross-sectional view of a thrust dynamic pressure bearing section of a dynamic pressure bearing apparatus of a variation of the embodiment shown in FIG. 8.

FIG. 10 shows a dynamic pressure thrust bearing section in accordance with another embodiment of the present invention. Members and parts of the embodiment shown in FIG. 10, which are similar to those of the embodiment shown in FIG. 8, are indicated by the same reference numbers. The dynamic pressure thrust bearing section shown in FIG. 10 includes a thrust plate 23 having a fixing aperture 23a. The aperture 23a has opening sections on both end surfaces of the thrust plate 23 in the axial direction and chamfered sections Ca' and Cb' formed at the opening sections. Each of the chamfered sections Ca' and Cb' is in a curved fillet shape in cross section. In this case, the axial lengths La and Lb and the radial lengths Ra and Rb of the chamfered sections Ca' and Cb' are measured from points of inflection Pa and Pb (where the chambered sections Ca' and Cb' contact the shaft 21) of the chamfered sections Ca' and Cb'. Dimensional relations of the chamfered sections Ca' and Cb' are set in a similar manner as those in the embodiment described above. As a result, the same actions and effects are obtained.

In the embodiment shown in FIG. 10, a peripheral edge section of an end face of the rotor shaft 21 (a lower end section of the rotor shaft 21 shown in the figure) is diagonally cut to form a chamfered section Cc'. The chamfered section Cc' is formed smaller than each of the chamfered sections Ca' and Cb' in the axial direction. Therefore, the chamfered section Cc' does not shorten the axial length Lh of the fixing connection section. Accordingly, only the dimensional relations of the chamfered sections Ca' and Cb' of the thrust plate 23 may have to be considered in order to determine the relevant dimensional conditions in a similar manner as described above. In contrast, when the axial length of the chamfered section Cc' on the rotor shaft 21 is greater than the axial length of each of the Ca' and Cb' on the thrust plate 23, the axial dimensions of the chamfered section Cc' on the rotor shaft 21 need to be considered to determine the other dimensional relations.

Figure 11:
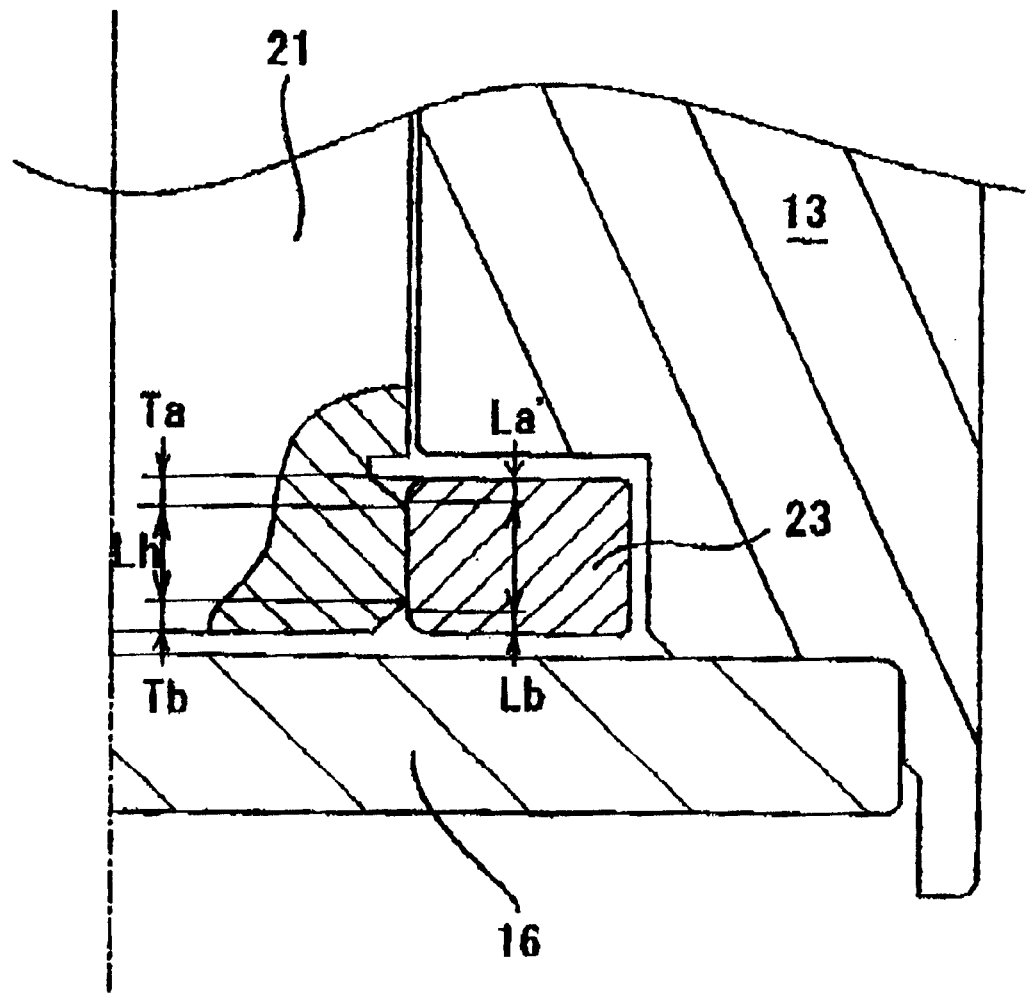
FIG. 11 is an expanded partial cross-sectional view of a thrust dynamic pressure bearing section of a dynamic pressure bearing apparatus of another variation of the embodiment shown in FIG. 8.

For example, FIG. 11 shows a dynamic pressure thrust bearing section in accordance with another embodiment of the present invention, in which the axial length of the chamfered section Cc' on the rotor shaft 21 is greater than the axial length of each of the Ca' and Cb' on the thrust plate 23. Members and parts of the embodiment shown in FIG. 11 similar to those of the embodiment shown in FIG. 10 are indicated by the same reference numbers. In this embodiment, the rotor shaft 21 is formed with a pair of chamfered sections that are spaced a distance from each other in the axial direction. The axial dimensions Ta and Tb of the chamfered sections on the rotor shaft 21 measured respectively with reference to end faces of the thrust plate 23 in the axial direction are greater than the axial dimensions La' and Lb' of the chamfered sections on the thrust plate 23, respectively. In other words, relations Ta! La' and Tb! Lb' are established. In this case, The axial length Lh of the fixing connection section is determined by the axial dimensions Ta and Tb of the chamfered sections on the rotor shaft 21. Accordingly, the axial dimensions Ta and Tb of the chamfered sections on the rotor shaft 21 are set in the same conditions as those of the embodiment described above.

In this case, the axial dimensions Ta and Tb of the chamfered sections on the rotor shaft 21 measured respectively with reference to the end faces of the thrust plate 23 in the axial direction determines the axial length Lh of the fixing connection section, and therefore correspond to the axial lengths La and Lb, respectively, that are considered in the other embodiments described above. Therefore, one of the axial dimensions Ta and Tb is set to be within a specified range of dimensional relations with respect to the other.

Figure 12:
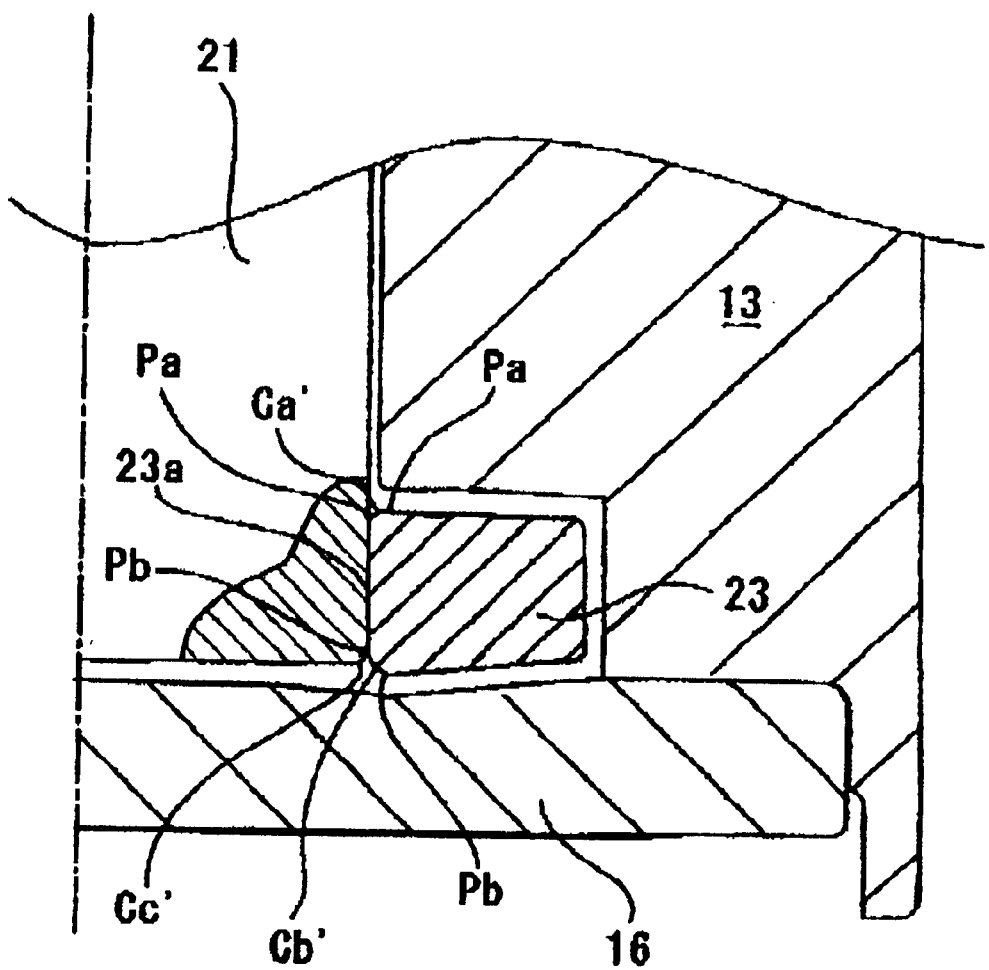
FIG. 12 is an expanded partial cross-sectional view of a thrust dynamic pressure bearing section of a dynamic pressure bearing apparatus of still another variation of the embodiment shown in FIG. 8.
Figure 13:
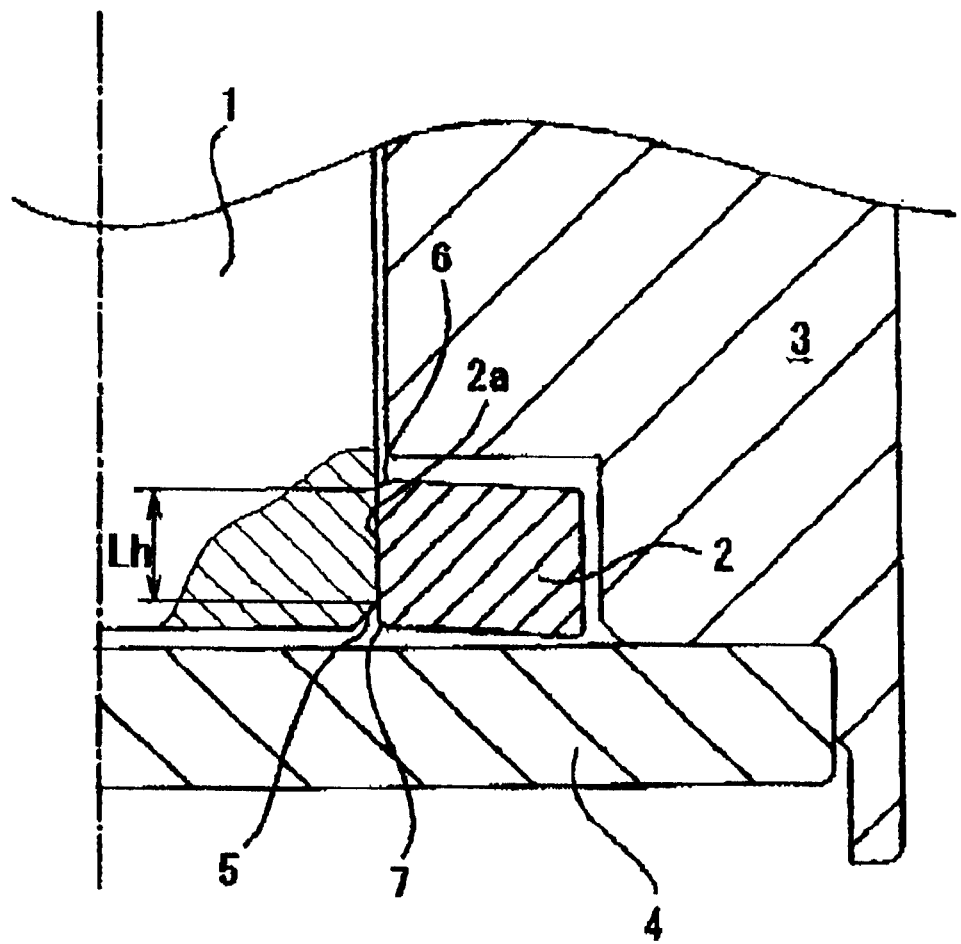
FIG. 13 is an expanded cross-sectional view of a thrust dynamic pressure bearing section of a conventional dynamic pressure bearing apparatus.

FIG. 12 shows a dynamic pressure thrust bearing section in accordance with another embodiment of the present invention. Members and parts of the embodiment shown in FIG. 12 that are similar to those of the embodiment shown in FIG. 10 are indicated by the same reference numbers. In the embodiment shown in FIG. 12, the thickness of the thrust plate 23 in the axial direction gradually reduces outwardly in the radial direction, such that both of the end surfaces of the thrust plate 23 in the axial direction are sloped. The bore 23a of the thrust plate 23 has opening sections on both end surfaces of the thrust plate 23 in the axial direction, and chamfered sections Ca' and Cb' formed at the opening sections. Each of the chamfered sections Ca' and Cb' is in a curved fillet shape in cross section. In this case, the axial distances La and Lb and the radial distances Ra and Rb of the chamfered sections Ca' and Cb' are measured from points of inflection Pa and Pb (where the chambered sections Ca' and Cb' contact the shaft 21) of the chamfered sections Ca' and Cb'. Dimensional relations of the chamfered sections Ca' and Cb' are set in a similar manner as those in the embodiment shown in FIG. 10 described above. As a result, the same actions and effects are obtained.

In the embodiment shown in FIG. 12, a peripheral edge section of an end face of the rotor shaft 21 (a lower end section of the rotor shaft 21 in the figure) is diagonally cut to form a chamfered section Cc'. The chamfered section Cc' is formed smaller than the chamfered section Cb' on the thrust is plate 23 in the axial direction. Therefore, the chamfered section Cc' does not need to be considered.

The embodiment shown in FIG. 12 is also applicable to the fixed shaft type HDD spindle motor shown in FIG. 7. Let us consider one example in which the thrust plate 36 shown in FIG. 7 has a cross-sectional configuration that is similar to the cross-sectional configuration of a thrust plate 23 shown in FIG. 12 (in other words, the thrust plate 36 shown in FIG. 7 is replaced with the thrust plate 23 shown in FIG. 12.)

In this case, open sections of the aperture 36a on both end faces of the thrust plate 36 are formed with chamfered sections Ca and Cb, respectively. The chamfered sections Ca and Cb are formed by diagonally cutting peripheral edges of the open sections of the aperture 36a of the thrust plate 36. Each of the chamfered sections Ca and Cb is linear in cross section. By the provision of the chamfered sections Ca and Cb, an opening area of each of the opening sections of the aperture 36a outwardly expands. As a result, the chamfered sections Ca and Cb facilitate insertion of the fixed shaft 35 in the thrust plate 36.

The thrust plate 36 is formed to have dimensional relations that are similar to those of the embodiment described above with reference to FIG. 8. The dimensional relations described above with reference to the embodiment shown in FIG. 8 may be employed for the embodiment of FIG. 12.

More specifically, the axial distance La and the axial distance Lb are defined by lengths from the end surfaces of the thrust plate 36 to both ends of the axial length Lh of the fixing connection section in the axial direction, respectively. One of the axial distances La and Lb is set to be within a specified range of dimensional relations with respect to the other.

In one embodiment, when the thrust plate 36 has an external diameter OD, an internal diameter ID and a thickness T in the axial direction, a relation OD−ID=$4T/\alpha(\alpha \leq 4)$ is established. Also, the axial length La and the axial length Lb or Tb satisfy relations with the given value of $\alpha$ as follows:

When Lb≦La, La≦αLb; or

When La≦Lb, Lb≦αLa.

Also, each of the axial lengths La and Lb is set to be 20% or less of the length Lh of the fixing connection section, in other words, the following relation is established:

$$La \leq 0.2Lh, \text{ or } Lb \leq 0.2Lh$$

By setting the dimensional relations in this manner, the bonding forces at both end sections of the thrust plate 36 in the axial direction are balanced, with the result that the bonding force of the thrust plate 36 with respect to the fixed shaft 35 is evenly distributed along the axial direction. As a result, the degree of deformation of the thrust plate 36 is limited to a very small amount in a range that does not affect the dynamic pressure characteristics.

As described above, in accordance with the present invention, a thrust plate having a fixing hole is provided with chamfered sections Ca and Cb at the fixing hole, and the dimensional relations of the axial lengths La and Lb in the chamfered sections Ca and Cb are appropriately set to be within a specified range. By setting the axial lengths of the chamfered sections Ca and Cb to be within a specified range of dimensional relations, the bonding force of the thrust plate applied to the shaft member is evenly distributed along the axial direction in order to suppress deformation of the thrust plate to a very small amount in a range that does not affect the dynamic pressure characteristics. As a result, the deformation of the thrust plate can be well prevented by a relatively simple structure, and good thrust dynamic pressure characteristics can be maintained for a long time. More specifically, nonsynchronous oscillation (NRRO) is reduced and good bearing characteristics can be obtained, and the service life of the bearing is extended. Accordingly, the reliability of the thrust dynamic pressure bearing apparatus can be substantially improved.

Also, in accordance with the present invention, when the internal surface of the fixing hole engages the external surface of the shaft member along a fixing connection section having a length Lh, the axial distances La and Lb measured from end faces of the thrust plate to ends of the fixing connection section in the axial direction are set within a specified range with respect to the length Lh. As a result, the bonding force of the thrust plate applied to the shaft member is evenly distributed along the axial direction, and deformation of the thrust plate is suppressed to a very small amount in a range that does not affect the dynamic pressure characteristics. As a result, the deformation of the thrust plate can be well prevented by a relatively simple structure, and good thrust dynamic pressure characteristics can be maintained for a long time. More specifically, nonsynchronous oscillation (NRRO) is reduced and good bearing characteristics can be obtained, abrasion of parts within the bearing assembly is prevented, and the service life of the bearing is extended. Accordingly, the reliability of the thrust dynamic pressure bearing apparatus can be substantially improved.

While the description above refers to particular embodiments of the present invention, it will be understood that many modifications may be made without departing from the spirit thereof. For example, the present invention is applicable to dynamic pressure bearing apparatuses that are used for motors other than HDD motors. The present invention is also applicable to dynamic pressure bearing apparatus that are used for polygon mirror drive motors, CD-ROM drive motors, and the like.

The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A thrust dynamic pressure bearing apparatus comprising:
   a shaft member;
   a thrust plate having a bore in which the shaft member is inserted to thereby affix the shaft member to the thrust plate;
   a thrust bearing member disposed opposite to the thrust plate in an axial direction of the shaft member, wherein a gap is formed between opposing surfaces of the thrust plate and the thrust bearing member to thereby form a thrust dynamic bearing section in the gap;
   a lubrication fluid filled in the thrust dynamic bearing section;
   a fluid pressure generating device that generates dynamic pressure in the lubrication fluid that rotatably support the shaft member and the thrust bearing member; and
   insertion joint means that generates a compression stress to be applied from an internal surface of the bore of the thrust plate to an external surface of the shaft member to affix the thrust plate and the shaft member to each other,
   wherein the bore of the thrust plate having peripheral edge sections on both end faces of the thrust plate in the axial direction, the peripheral edge sections having chamfer sections Ca and Cb, wherein the distances from end faces of the thrust plate in the axial direction to ends of the insertion connection section having the length Lh are defined by axial lengths La and Lb, and
   wherein the thrust plate has an external diameter OD, an internal diameter ID and a thickness T in the axial direction, and the chamfer sections Ca and Oh have the axial lengths La and Lb in the axial direction and lengths Ra and Rb in a radial direction, respectively, which have relations as follows:
   $OD-ID \geq T$, and $La \geq 0.01T$, and $Lb \geq 0.01T$, and $Ra \geq 0.01T$, and $Rb \geq 0.01T$, and wherein, when an equation $OD-ID=4T\alpha$ $(\alpha \leq 4)$ is established, the lengths La and Lb have relations with a given value of $\alpha$ as follows:

$La \leq \alpha Lb$, or $Lb \leq \alpha Lb$, and wherein the axial lengths La and Lb have a relation with respect to the length Lh as $La \leq 0.2Lh$, or $Lb \leq 0.2Lh$.

2. A thrust dynamic pressure bearing apparatus according to claim 1, wherein the insertion joint means is achieved by one of a pressure insertion and a shrink-fit insertion.

3. A thrust dynamic pressure bearing apparatus according to claim 1, wherein each of the chamfer sections Ca and Oh is linear in cross section or curved in cross section.

4. A method of manufacturing a thrust dynamic pressure bearing apparatus, the thrust dynamic pressure bearing apparatus comprising:
   a shaft member;
   a thrust plate having a bore in which the shaft member is inserted to thereby affix the shaft member to the thrust plate;
   a thrust bearing member disposed opposite to the thrust plate in an axial direction of the shaft member, wherein a gap is formed between opposing surfaces of the thrust plate and the thrust bearing member to thereby form a thrust dynamic bearing section in the gap;
   a lubrication fluid filled in the thrust dynamic bearing section; and
   a fluid pressure generating device that generates dynamic pressure in the lubrication fluid that rotatably supports the shaft member and the thrust bearing member,
   the method comprising the steps of:
      forming chamfer sections Ca and Cb at peripheral edge sections of the bore of the thrust plate on both end faces of the thrust plate in the axial direction, wherein the distances from end Laces of the thrust plate in the axial direction to ends of the insertion connection section having the length Lh are defined by axial lengths La and Lb, wherein the thrust plate has an external diameter OD, an internal diameter ID and a thickness T in the axial direction, and the chamfer sections Ca and Cb have the axial lengths La and Lb in the axial direction and lengths Ra and Rb in a radial direction, respectively;
      setting OD, ID, T, La, Lb, Ra and Rb to have relations of $OD-ID \geq T$, and $La \geq 0,01T$, and $Lb \geq 0.01T$, and $Ra \geq 0.01T$, and $Rb \geq 0.01T$;
      when an equation $OD-ID=4T/\alpha$ $(\alpha \leq 4)$ is established, setting La and Lb with a given value of $\alpha$ to have a relation of $La \leq \alpha Lb$, or $Lb \leq \alpha Lb$, and wherein the axial lengths La and Lb have a relation with respect to the length Lh as $La \leq 0.2Lh$, or $Lb \leq 0.2Lh$; and
      connecting the thrust plate and the shaft member to each other by insertion joint means that generates a compression stress applied from an internal surface of the bore of the thrust plate to an external surface of the shaft member.

5. A method of manufacturing a thrust dynamic pressure bearing apparatus according to claim 4, wherein the insertion joint means between the thrust plate and the shaft member is achieved by one of a pressure insertion and a shrink-fit insertion.

6. A method of manufacturing a thrust dynamic pressure bearing apparatus according to claim 4, wherein each of the chamfer sections Ca and Cb is linear in cross section thereof or a curved edge in a cross section thereof.

7. A thrust dynamic pressure bearing apparatus comprising:
- a shaft member;
- a thrust plate having a bore in which the shaft member is inserted to thereby affix the shaft member to the thrust plate;
- a thrust bearing member disposed opposite to the thrust plate in an axial direction of the shaft member with a gap provided between opposing surfaces of the thrust plate and the thrust bearing member to thereby form a thrust dynamic hearing Section in the gap;
- a lubrication fluid filled in the thrust dynamic bearing section;
- a fluid pressure generating device that generates dynamic pressure in the lubrication fluid that rotatably supports the shaft member and the thrust bearing member; and
- insertion joint means that generates a compression stress to be applied from an internal surface of the bore of the thrust plate to an external surface of the shaft member to affix the thrust plate and the shaft member to each other in an insertion connection section having a length Lh in the axial direction,
- wherein the thrust plate has an external diameter OD), an internal diameter ID and a thickness T in the axial direction, which establish a relation of OD−ID=4T/$\alpha$ ($\alpha \leq 4$), and
- wherein distances from end faces of the thrust plate in the axial direction to ends of the insertion connection section having the length Lh are defined by axial lengths La and Lb, respectively, the axial lengths La and Lb have a relation with a given value of $\alpha$ as follows:
  when Lb$\leq$La, La$\leq\alpha$Lb, or
  when La$\leq$Lb, Lb$\leq\alpha$La,
  wherein the axial lengths La and Lb have a relation with respect to the length Lh as follows:

La$\leq$0.2Lh or Lb$\leq$0.2Lh.

8. A thrust dynamic pressure bearing apparatus according to claim 7, wherein the insertion joint means is achieved by one of a pressure insertion and a shrink-fit insertion.

9. A thrust dynamic pressure bearing apparatus according to claim 9, wherein at least one of the axial lengths La and Lb defines a chamfer section formed at a shaft end section of the shaft member, or a chamfer section formed at each of open edge sections of the bore of the thrust plate in both of end surfaces of the thrust plate, or a combination thereof, and wherein each of the chamfer sections is linear in cross section thereof or curved in cross section.

10. A method for manufacturing a thrust dynamic pressure hearing apparatus, the thrust dynamic pressure bearing apparatus comprising:
- a shaft member;
- a thrust plate having a bore in which the shaft member is inserted to thereby affix the shaft member to the thrust plate;
- a thrust bearing member disposed opposite to the thrust plate in an axial direction of the shaft member with a gap provided between opposing surfaces of the thrust plate and the thrust bearing member to form a thrust dynamic bearing section in the gap;
- a lubrication fluid filled in the thrust dynamic bearing section; and
- a fluid pressure generating device that generates dynamic pressure in the lubrication fluid, the method comprising the steps of:
- forming the thrust plate with an external diameter OD, an internal diameter ID and a thickness T in the axial direction to establish a relation of OD−ID=4T/$\alpha$ ($\alpha \leq 4$);
- wherein distances from end faces of the thrust plate in the axial direction to ends of the insertion connection section having the length Lh are defined by axial lengths La and Lb, respectively, setting the axial lengths La and Lb with a given value of $\alpha$ to have a relation of:
  when Lb$\leq$La, La$\leq\alpha$Lb, or
  when La$\leq$Lb, Lb$\leq\alpha$La, wherein the axial lengths La and Lb have a relation with respect to the length Lh as follows:

La$\leq$0.2Lh or Lb$\leq$0.2Lh; and

- connecting the thrust plate and the shaft member to each other by insertion joint means that generates a compression stress to be applied from an internal surface of the bore of the thrust plate to an external surface of the shaft member along an insertion connection section having a length Lh in the axial direction; and
- rotatably supporting the shaft member and the thrust bearing member by the dynamic pressure generated in the lubrication fluid.

11. A method for manufacturing a thrust dynamic pressure bearing apparatus according to claim 10, wherein the insertion joint means that generates a compression stress to be applied from an internal surface of the bore of the thrust plate to an external surface of the shaft member to thereby connect the thrust plate and the shaft member to each other is achieved by one of a pressure insertion and a shrink-fit.

12. A method for manufacturing a thrust dynamic pressure bearing apparatus according to claim 10, wherein at least one of the axial lengths La and Lb defines a chamfer section formed at a shaft end section of the shaft member, or a chamfer section formed at each of open edge sections of the bore of the thrust plate in both of end surfaces of the thrust plate, or a combination thereof, and wherein each of the chamfer sections is linear in cross section thereof or a curved edge in a cross section thereof.

* * * * *

UNITED STATES PATENT AND TRADEMARK OFFICE
CERTIFICATE OF CORRECTION

PATENT NO. : 6,663,287 B2
DATED : December 16, 2003
INVENTOR(S) : Gomyo et al.

It is certified that error appears in the above-identified patent and that said Letters Patent is hereby corrected as shown below:

Columns 15-18,
The attached listing of claims should replace all prior versions, and listings of claims in the application.

Signed and Sealed this

Second Day of November, 2004

JON W. DUDAS
*Director of the United States Patent and Trademark Office*

1. (Previously Amended) A thrust dynamic pressure bearing apparatus comprising:
   a shaft member;
   a thrust plate having a bore in which the shaft member is inserted to thereby affix the shaft member to the thrust plate;
   a thrust bearing member disposed opposite to the thrust plate in an axial direction of the shaft member, wherein a gap is formed between opposing surfaces of the thrust plate and the thrust bearing member to thereby form a thrust dynamic bearing section in the gap;
   a lubrication fluid filled in the thrust dynamic bearing section;
   a fluid pressure generating device that generates dynamic pressure in the lubrication fluid that rotatably support the shaft member and the thrust bearing member; and
   insertion joint means that generates a compression stress to be applied from an internal surface of the bore of the thrust plate to an external surface of the shaft member to affix the thrust plate and the shaft member to each other,
   wherein the bore of the thrust plate having peripheral edge sections on both end faces of the thrust plate in the axial direction, the peripheral edge sections having chamfer sections $Ca$ and $Cb$, wherein the distances from end faces of the thrust plate in the axial direction to ends of the insertion connection section having the length $Lh$ are defined by axial lengths $La$ and $Lb$, and
   wherein the thrust plate has an external diameter $OD$, an internal diameter $ID$ and a thickness $T$ in the axial direction, and the chamfer sections $Ca$ and $Cb$ have the axial lengths $La$ and $Lb$ in the axial direction and lengths $Ra$ and $Rb$ in a radial direction, respectively, which have relations as follows:

$OD - ID \geq T$, and $La \geq 0.01T$, and $Lb \geq 0.01T$, and $Ra \geq 0.01T$, and $Rb \geq 0.01T$, and wherein, when an equation $OD - ID = 4T/\alpha$ ($\alpha \leq 4$) is established, the lengths $La$ and $Lb$ have relations with a given value of $\alpha$ as follows:
   $La \leq \alpha Lb$, or $Lb \leq \alpha Lb$, and
   wherein the axial lengths $La$ and $Lb$ have a relation with respect to the length $Lh$ as $La \leq 0.2Lh$, or $Lb \leq 0.2Lh$.

2. (Original) A thrust dynamic pressure bearing apparatus according to claim 1, wherein the insertion joint means is achieved by one of a pressure insertion and a shrink-fit insertion.

3. (Original) A thrust dynamic pressure bearing apparatus according to claim 1, wherein each of the chamfer sections $Ca$ and $Cb$ is linear in cross section or curved in cross section.

4. (Previously Amended) A method of manufacturing a thrust dynamic pressure bearing apparatus, the thrust dynamic pressure bearing apparatus comprising:
   a shaft member;
   a thrust plate having a bore in which the shaft member is inserted to thereby affix the shaft member to the thrust plate;
   a thrust bearing member disposed opposite to the thrust plate in an axial direction of the shaft member, wherein a gap is formed between opposing surfaces of the thrust plate and the thrust bearing member to thereby form a thrust dynamic bearing section in the gap;
   a lubrication fluid filled in the thrust dynamic bearing section; and
   a fluid pressure generating device that generates dynamic pressure in the lubrication fluid that rotatably supports the shaft member and the thrust bearing member,
   the method comprising the steps of:
   forming chamfer sections $Ca$ and $Cb$ at peripheral edge sections of the bore of the thrust plate on both end faces of the thrust plate in the axial direction, wherein the distances from end faces of the thrust plate in the axial direction to ends of the insertion connection section having the length $Lh$ are defined by axial lengths $La$ and $Lb$, wherein the thrust plate has an external diameter $OD$, an internal diameter $ID$ and a thickness $T$ in the axial direction, and the chamfer sections $Ca$ and $Cb$ have the axial lengths $La$ and $Lb$ in the axial direction and lengths $Ra$ and $Rb$ in a radial direction, respectively;
   setting $OD$, $ID$, $T$, $La$, $Lb$, $Ra$ and $Rb$ to have relations of $OD - ID \geq T$, and $La \geq 0.01T$, and $Lb \geq 0.01T$, and $Ra \geq 0.01T$, and $Rb \geq 0.01T$;
   when an equation $OD - ID = 4T/\alpha$ ($\alpha \leq 4$) is established, setting $La$ and $Lb$ with a given value of $\alpha$ to have a relation of
   $La \leq \alpha Lb$, or $Lb \leq \alpha Lb$, and
   wherein the axial lengths $La$ and $Lb$ have a relation with respect to the length $Lh$ as $La \leq 0.2Lh$, or $Lb \leq 0.2Lh$; and
   connecting the thrust plate and the shaft member to each other by insertion joint means that generates a compression stress applied from an internal surface of the bore of the thrust plate to an external surface of the shaft member.

5. (Original) A method of manufacturing a thrust dynamic pressure bearing apparatus according to claim 4, wherein the insertion joint means between the thrust plate and the shaft member is achieved by one of a pressure insertion and a shrink-fit insertion.

6. (Original) A method of manufacturing a thrust dynamic pressure bearing apparatus according to claim 4, wherein each of the chamfer sections Ca and Cb is linear in cross section thereof or a curved edge in a cross section thereof.

7. (Cancelled)

8. (Previously Amended) A thrust dynamic pressure bearing apparatus according to claim 9, wherein the insertion joint means is achieved by one of a pressure insertion and a shrink-fit insertion.

9. (Previously Amended) A thrust dynamic pressure bearing apparatus comprising:
a shaft member;
a thrust plate having a bore in which the shaft member is inserted to thereby affix the shaft member to the thrust plate;
a thrust bearing member disposed opposite to the thrust plate in an axial direction of the shaft member with a gap provided between opposing surfaces of the thrust plate and the thrust bearing member to thereby form a thrust dynamic bearing section in the gap;
a lubrication fluid filled in the thrust dynamic bearing section;
a fluid pressure generating device that generates dynamic pressure in the lubrication fluid that rotatably supports the shaft member and the thrust bearing member; and
insertion joint means that generates a compression stress to be applied from an internal surface of the bore of the thrust plate to an external surface of the shaft member to affix the thrust plate and the shaft member to each other in an insertion connection section having a length $Lh$ in the axial direction,
wherein the thrust plate has an external diameter OD, an internal diameter ID and a thickness T in the axial direction, which establish a relation of $OD - ID = 4T/\alpha$ ($\alpha \leq 4$), and
wherein distances from end faces of the thrust plate in the axial direction to ends of the insertion connection section having the length $Lh$ are defined by axial lengths $La$ and $Lb$ respectively, the axial lengths $La$ and $Lb$ have a relation with a given value of $\alpha$ as follows:
when $Lb \leq La$, $La \leq \alpha Lb$, or
when $La \leq Lb$, $Lb \leq \alpha La$,
wherein the axial lengths $La$ and $Lb$ have a relation with respect to the length $Lh$ as follows:
$La \leq 0.2 Lh$ or $Lb \leq 0.2 Lh$.

10. (Previously Amended) A thrust dynamic pressure bearing apparatus according to claim 9, wherein at least one of the axial lengths $La$ and $Lb$ defines a chamfer section formed at a shaft end section of the shaft member, or a chamfer section formed at each of open edge sections of the bore of the thrust plate in both of end surfaces of the thrust plate or a combination thereof, and wherein each of the chamfer sections is linear in cross section thereof or curved in cross section.

11. (Cancelled)

12. (Previously Amended) A method for manufacturing a thrust dynamic pressure bearing apparatus according to claim 13, wherein the insertion joint means that generates a compression stress to be applied from an internal surface of the bore of the thrust plate to an external surface of the shaft member to thereby connect the thrust plate and the shaft member to each other is achieved by one of a pressure insertion and a shrink-fit.

13. (Previously Amended) A method for manufacturing a thrust dynamic pressure bearing apparatus, the thrust dynamic pressure bearing apparatus comprising:
a shaft member;
a thrust plate having a bore in which the shaft member is inserted to thereby affix the shaft member to the thrust plate;
a thrust bearing member disposed opposite to the thrust plate in an axial direction of the shaft member with a gap provided between opposing surfaces of the thrust plate and the thrust bearing member to form a thrust dynamic bearing section in the gap;
a lubrication fluid filled in the thrust dynamic bearing section; and
a fluid pressure generating device that generates dynamic pressure in the lubrication fluid,
the method comprising the steps of:
forming the thrust plate with an external diameter OD, an internal diameter ID and a thickness T in the axial direction to establish a relation of $OD - ID = 4T/\alpha$ ($\alpha \leq 4$);
wherein distances from end faces of the thrust plate in the axial direction to ends of the insertion connection section having the length $Lh$ are defined by axial lengths $La$ and $Lb$ respectively, setting the axial lengths $La$ and $Lb$ with a given value of $\alpha$ to have a relation of:
when $Lb \leq La$, $La \leq \alpha Lb$, or
when $La \leq Lb$, $Lb \leq \alpha La$, wherein the axial lengths $La$ and $Lb$ have a relation with respect to the length $Lh$ as follows:
$La \leq 0.2 Lh$ or $Lb \leq 0.2 Lh$; and connecting the thrust plate and the shaft member to each other by insertion joint means that generates a compression stress to be applied from an internal surface of the bore of the thrust plate to an external surface of the shaft member along an insertion connection section having a length Lh in the axial direction; and rotatably supporting the shaft member and the thrust bearing member by the dynamic pressure generated in the lubrication fluid.

14. (Previously Amended) A method for manufacturing a thrust dynamic pressure bearing apparatus according to claim 13, wherein at least one of the axial lengths La and Lb defines a chamfer section formed at a shaft end section of the shaft member, or a chamfer section formed at each of open edge sections of the bore of the thrust plate in both of end surfaces of the thrust plate, or a combination thereof, and wherein each of the chamfer sections is linear in cross section thereof or a curved edge in a cross section thereof.